(12) United States Patent
Turnbull

(10) Patent No.: US 11,391,857 B2
(45) Date of Patent: Jul. 19, 2022

(54) METHODS AND SYSTEMS FOR ATTENUATING RESIDUAL ACOUSTIC ENERGY IN SEISMIC DATA

(71) Applicant: PGS Geophysical AS, Oslo (NO)

(72) Inventor: Neil Turnbull, Edinburgh (GB)

(73) Assignee: PGS Geophysical AS, Oslo (NO)

( * ) Notice: Subject to any disclaimer, the term of this patent is extended or adjusted under 35 U.S.C. 154(b) by 1534 days.

(21) Appl. No.: 14/258,552

(22) Filed: Apr. 22, 2014

(65) Prior Publication Data

US 2015/0185348 A1    Jul. 2, 2015

Related U.S. Application Data

(60) Provisional application No. 61/921,940, filed on Dec. 30, 2013.

(51) Int. Cl.
*G01V 1/36* (2006.01)
*G01V 1/28* (2006.01)
*G01V 1/38* (2006.01)
*G01V 1/42* (2006.01)

(52) U.S. Cl.
CPC .......... *G01V 1/36* (2013.01); *G01V 1/28* (2013.01); *G01V 1/362* (2013.01); *G01V 1/3808* (2013.01); *G01V 1/3843* (2013.01); *G01V 1/3852* (2013.01); *G01V 1/38* (2013.01); *G01V 1/42* (2013.01)

(58) Field of Classification Search
None
See application file for complete search history.

(56) References Cited

U.S. PATENT DOCUMENTS 4,203,161 A * 5/1980 Johnson ............... G01V 1/366
                                                    367/40
4,204,279 A * 5/1980 Parrack ............... G01V 1/366
                                                    367/63

(Continued)

FOREIGN PATENT DOCUMENTS

CN      101925835 A  * 12/2010  ............ G01V 1/362
EP       2428823 A1  *  3/2012  ............ G01V 1/24

OTHER PUBLICATIONS

Machine Translation for CN101925835 (Year: 2010).*

(Continued)

*Primary Examiner* — Kyle R Quigley
*Assistant Examiner* — Leonard S Liang

(57) ABSTRACT

Systems and methods for attenuating residual acoustic energy in marine seismic data are disclosed. In one aspect, a number of gathers are recorded for consecutive activations of a marine source. Each recorded gather contains a record of acoustic reflections from a subterranean formation after activation of the source and residual acoustic energy from one or more previous activations of the source. The gathers are aligned to generate aligned gathers with the residual acoustic energy coherent between the aligned gathers and the reflections incoherent between the aligned gathers. A set of model gathers of the residual acoustic energy is generated from the aligned gathers. The model gathers are subtracted from one or more of the corresponding recorded gathers to generate one or more gathers with attenuated residual acoustic energy.

36 Claims, 21 Drawing Sheets

(56) References Cited

U.S. PATENT DOCUMENTS

| | | | | |
|---|---|---|---|---|
| 4,760,563 | A | * | 7/1988 | Beylkin .................. G01V 1/32 367/43 |
| 4,992,995 | A | * | 2/1991 | Favret ..................... G01V 1/36 367/43 |
| 5,182,729 | A | * | 1/1993 | Duren ..................... G01V 1/20 367/21 |
| 5,293,352 | A | * | 3/1994 | Chambers ............. G01V 1/362 367/21 |
| 5,729,506 | A | * | 3/1998 | Dragoset, Jr. ......... G01V 1/364 367/21 |
| 5,818,795 | A | | 10/1998 | Hawkins et al. |
| 5,870,691 | A | * | 2/1999 | Partyka .................. G01V 1/301 702/16 |
| 5,995,905 | A | * | 11/1999 | Ikelle ...................... G01V 1/36 702/14 |
| 6,021,379 | A | * | 2/2000 | Duren .................... G01V 1/282 367/73 |
| 6,466,873 | B2 | | 10/2002 | Ren et al. |
| 6,574,567 | B2 | | 6/2003 | Martinez |
| 6,751,559 | B2 | | 6/2004 | Fookes et al. |
| 6,906,981 | B2 | | 6/2005 | Vaage |
| 7,123,543 | B2 | * | 10/2006 | Vaage .................... G01V 1/364 367/24 |
| 7,835,225 | B2 | * | 11/2010 | Sollner ................ G01V 1/3808 367/24 |
| 7,869,303 | B2 | | 1/2011 | Kinkiad |
| 2007/0076525 | A1 | * | 4/2007 | Craft ....................... G01V 1/36 367/38 |
| 2009/0323470 | A1 | * | 12/2009 | Ferris .................... G01V 1/364 367/24 |
| 2010/0008184 | A1 | * | 1/2010 | Hegna .................... G01V 1/36 367/21 |
| 2011/0063947 | A1 | * | 3/2011 | Norris ................. G01V 1/3808 367/21 |
| 2011/0096625 | A1 | * | 4/2011 | Rentsch ................. G01V 1/364 367/38 |
| 2013/0030709 | A1 | * | 1/2013 | Ferber .................... G01V 1/36 702/16 |
| 2013/0088235 | A1 | * | 4/2013 | Hegna ................. G01V 1/3808 324/334 |
| 2013/0088938 | A1 | | 4/2013 | Aaron et al. |
| 2013/0121109 | A1 | * | 5/2013 | Baardman ................ G01V 1/36 367/24 |
| 2013/0155810 | A1 | * | 6/2013 | Dowle ................. G01V 1/3861 367/23 |
| 2013/0226462 | A1 | | 8/2013 | Brittan et al. |
| 2013/0235697 | A1 | * | 9/2013 | Szydlik .................. G01V 1/282 367/73 |
| 2013/0315033 | A1 | * | 11/2013 | Krohn .................... G01V 1/364 367/43 |
| 2014/0078860 | A1 | * | 3/2014 | Poole ..................... G01V 1/364 367/7 |
| 2014/0119157 | A1 | * | 5/2014 | Whitmore, Jr. .......... G01V 1/38 367/11 |
| 2014/0121977 | A1 | * | 5/2014 | Lecocq ................... G01V 1/38 702/11 |
| 2014/0269169 | A1 | * | 9/2014 | van Borselen ....... G01V 1/3861 367/15 |
| 2014/0269182 | A1 | | 9/2014 | Parkes et al. |
| 2014/0269183 | A1 | * | 9/2014 | Kluver .................... G01V 1/38 367/24 |
| 2015/0032379 | A1 | * | 1/2015 | Campbell ................ G01V 1/42 702/14 |
| 2015/0063064 | A1 | * | 3/2015 | van Groenestijn .... G01V 1/362 367/21 |
| 2015/0185342 | A1 | * | 7/2015 | van Groenestijn .... G01V 1/364 702/14 |
| 2015/0369936 | A1 | * | 12/2015 | van Groenestijn .. G01V 1/3817 702/14 |

OTHER PUBLICATIONS

Warner et al; "Anistropic 3D full-waveform inversion", Geophysics, vol. 78, No. 2 (Mar.-Apr. 2013); p. R59-R80, 20 Figs. 10.1190/GE02012-0338.1 (Year: 2013).*

Gulunay, N.; "Two different algorithms for seismic interference noise attenuation," The Leading Edge, Feb. 2008. (Year: 2008).*

Landro, Martin, "The effect of noise generated by previous shots on seismic reflection data", Geophysics, vol. 73, No. 3, May-Jun. 2008, pp. Q9-Q17.

* cited by examiner

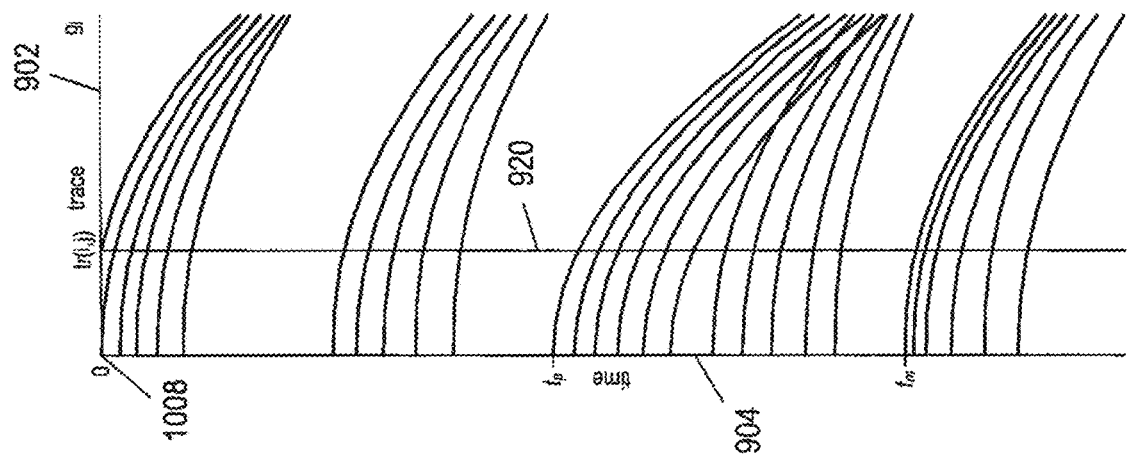
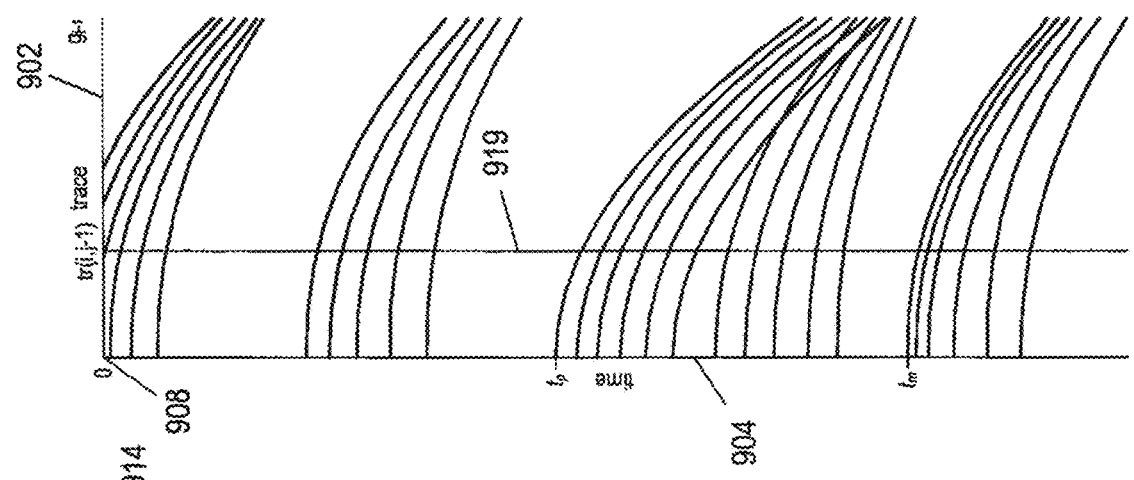
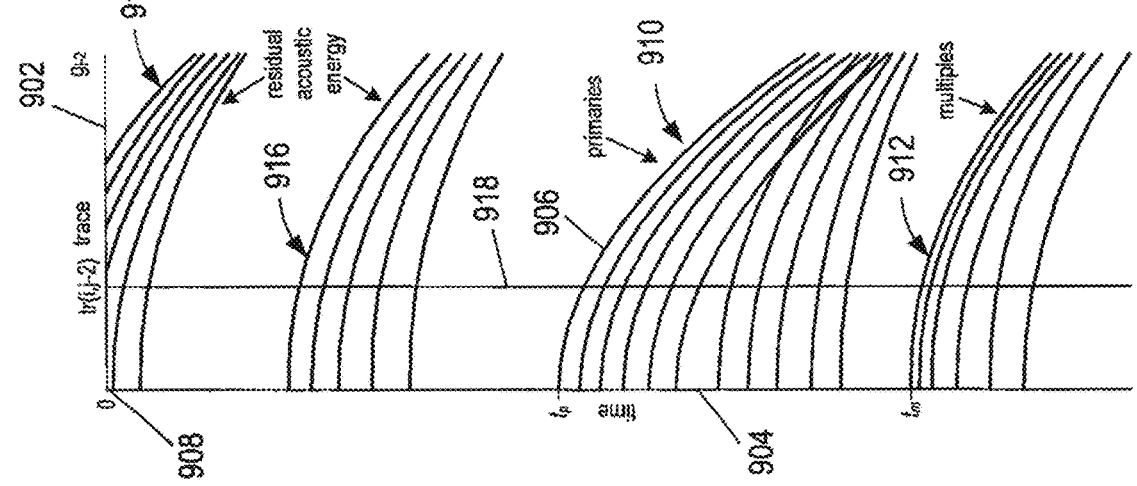

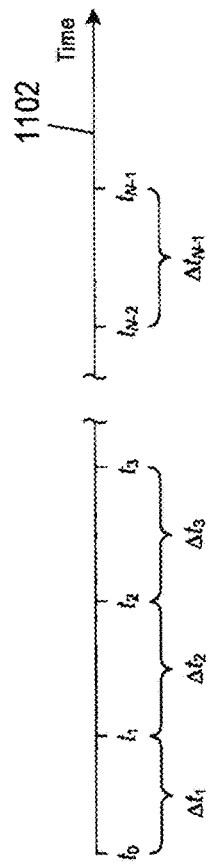
FIG. 11
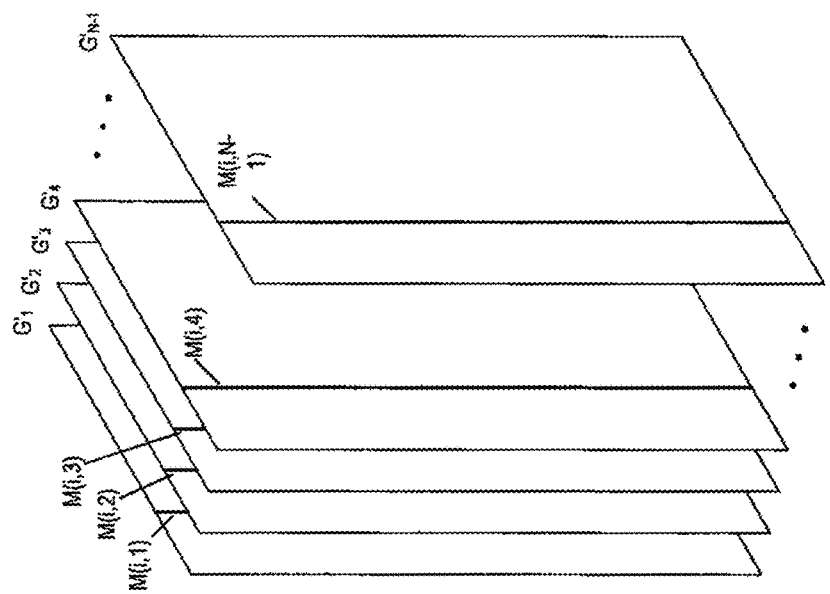
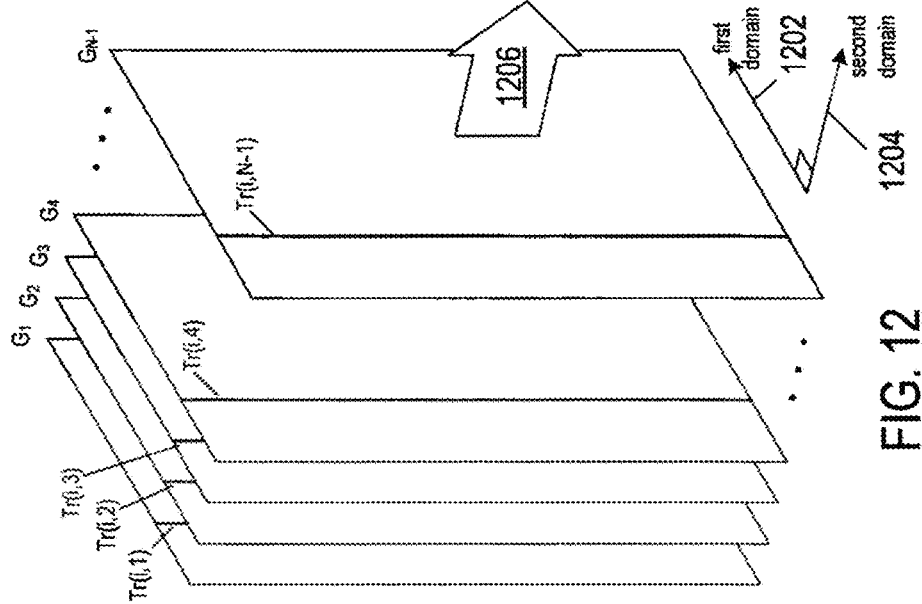
FIG. 12

METHODS AND SYSTEMS FOR ATTENUATING RESIDUAL ACOUSTIC ENERGY IN SEISMIC DATA

BACKGROUND

In the past few decades, the petroleum industry has invested heavily in the development of marine seismic survey techniques that yield knowledge of subterranean formations beneath a body of water in order to find and extract valuable resources, such as oil. High-resolution seismic images of a subterranean formation are important for quantitative seismic interpretation and petroleum reservoir monitoring. For a typical marine seismic survey, a survey vessel tows a seismic source, and the same vessel, or another vessel, tows one or more streamers that form a seismic data acquisition array below the surface of the water and above a subterranean formation to be surveyed for resources. The survey vessel typically contains seismic acquisition equipment, such as navigation control, seismic source control, seismic receiver control, and recording equipment. The seismic source control activates a seismic source, which is typically an array of source elements, such as air guns or marine vibrators, that produces acoustic signals at selected times. Acoustic signals (also referred to as sound waves) travel down through the water and into the subterranean formation. At interfaces between different types of rock, a portion of the sound wave may be transmitted and another portion may be reflected back into the body of water as a wavefield that propagates upward toward the water surface. The streamers towed behind the vessel are elongated cable-like structures equipped with a number of seismic receivers that detect pressure and/or particle motion wavefields associated with the sound waves.

For a typical marine seismic survey, the survey vessel tows the source at an approximately constant speed, and seismic data is recorded in the time intervals between sources activations. However, acoustic energy does not stop emanating from the subterranean formation before a next source activation (i.e., "shot"). As a result, seismic data recorded after activation of the source is typically contaminated with acoustic energy still emanating from the subterranean formation from a previous activation. Although this residual acoustic energy is typically low in amplitude, it is coherent with the low-frequency part of the seismic data frequency spectrum, and therefore, contaminates seismic data by adding constructively to the low-frequency part of the seismic data. Those working in the petroleum industry seek systems and methods to reduce residual acoustic energy.

DESCRIPTION OF THE DRAWINGS

FIGS. 9A-9C show three examples of three consecutively recorded shot gathers.

FIG. 11 shows a source-activation time line.

FIG. 12 shows noise aligned gathers.

DETAILED DESCRIPTION

Acoustic energy emanating from a subterranean formation gradually decays over time. However, residual acoustic energy ("RAE") associated with a previous activation of a source may linger long enough to appear as noise in seismic data recorded after a subsequent activation of the source. In order to minimize noise associated with RAE, traditional marine seismic surveys are typically conducted with time intervals between activations that are greater than a minimum time interval determined by RAE decay. This disclosure presents methods and systems for attenuating RAE in seismic data recorded after each source activation, which allows marine seismic surveys to be conducted with considerably shorter time intervals between activations than the minimum time interval traditionally used in marine seismic surveys. Seismic data may also be recorded with minimal gaps, even as much as continuously recorded, along a ship track, and aligned in time from activation to activation. Methods and systems described below are based variations in time intervals between activations of the source. The variation in time intervals between source activations may be an unsynchronized variation due to changing environmental conditions in which the survey is conducted or due to randomized or pseudo-randomized source activation times.

Figure 1A:
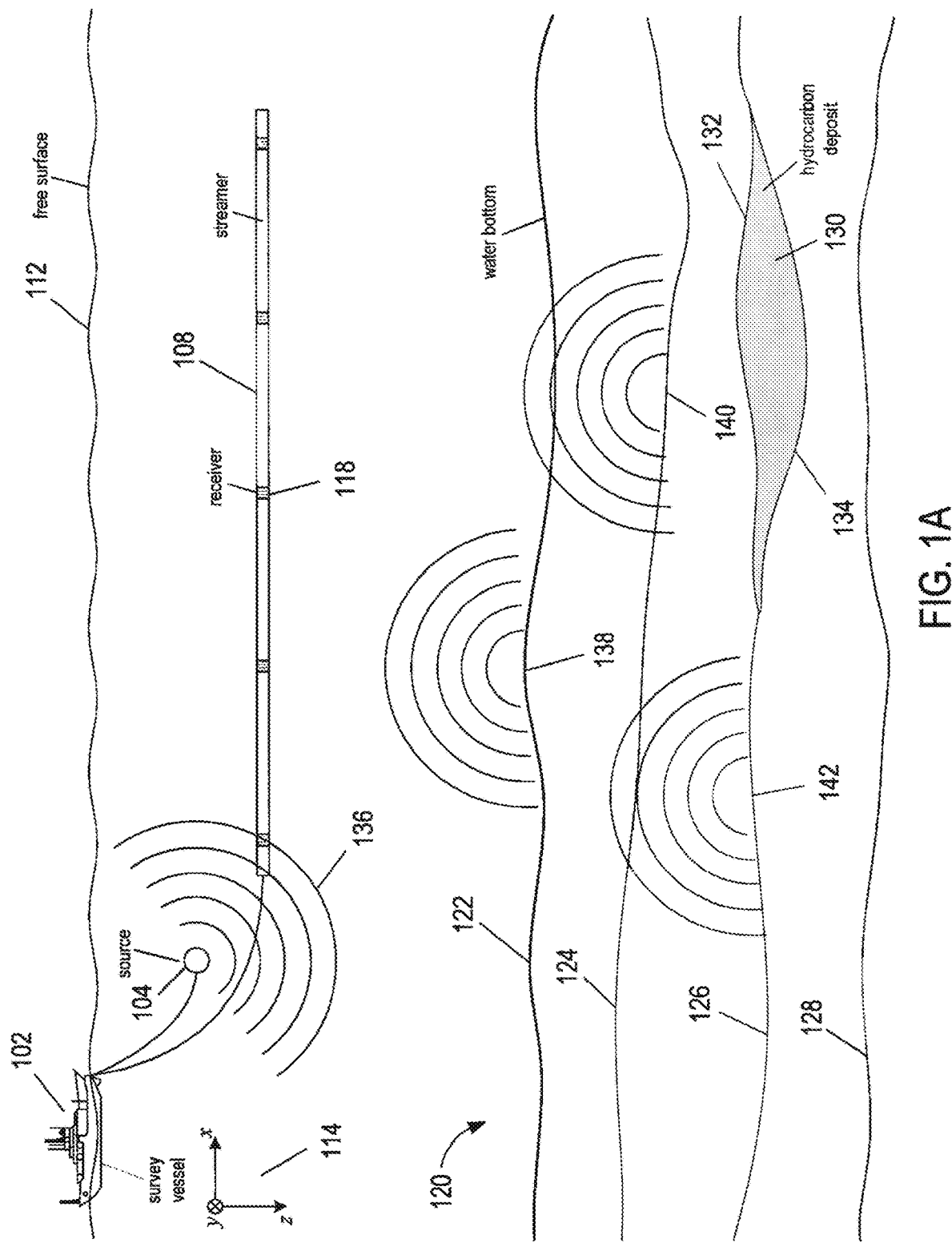
FIGS. 1A-1B show side-elevation and top views of an example seismic data acquisition system.
Figure 1B:
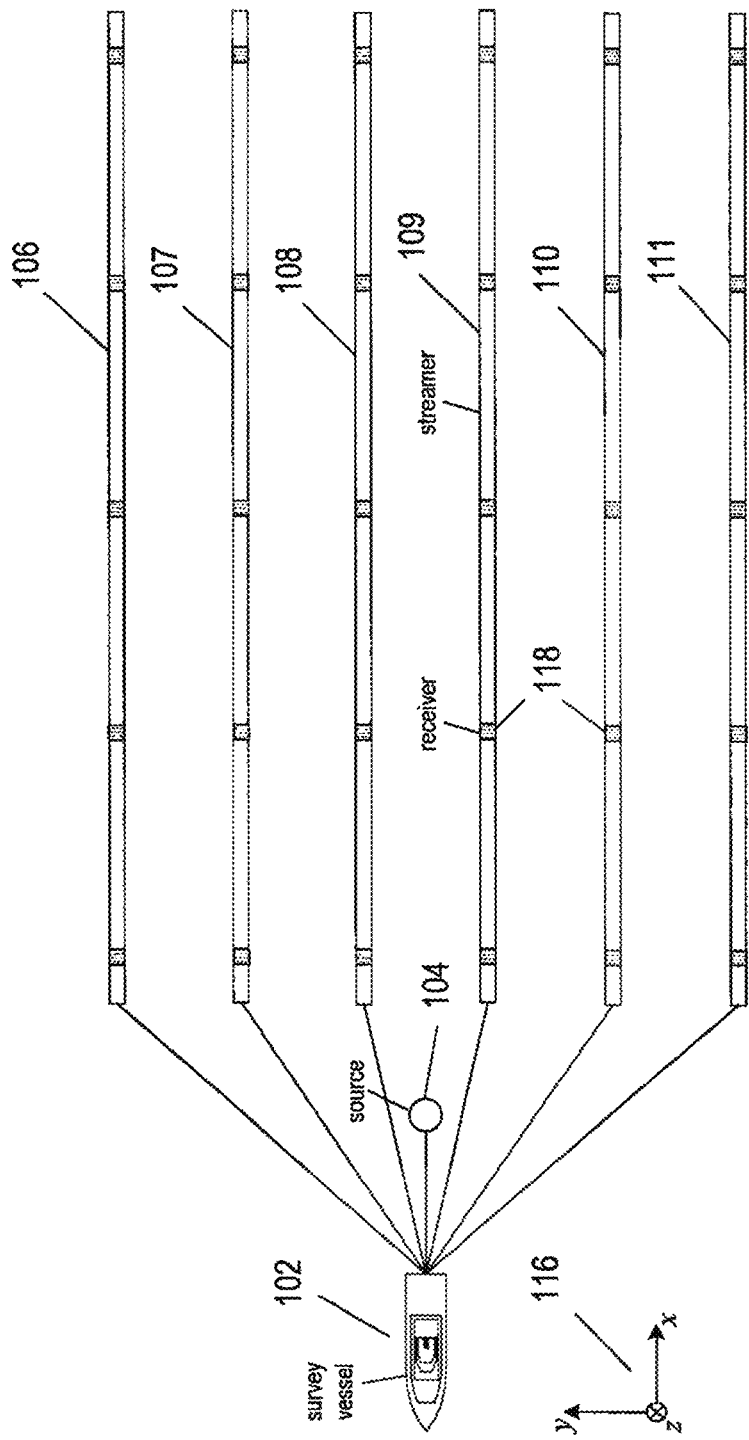

FIGS. 1A-1B show side-elevation and top views, respectively, of an example seismic data acquisition system composed of an survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers 118 (represented by shaded rectangles) spaced-apart along the length of each streamer to seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 may be activated to produce an acoustic signal at spatial and/or temporal intervals. In other implementations, the source 104 may be towed by one survey vessel and the streamers may be towed by a different survey vessel. The source 104 may be an air gun, marine vibrator, or composed of an array of air guns and/or marine vibrators. FIG. 1A illustrates an acoustic signal expanding outward from the source 104 as a pressure wavefield 136 represented by semicircles of increasing radius centered at the source 104. The outwardly expanding wave fronts from the sources may be spherical but are shown in vertical plane cross section in FIG. 1A. The outward and downward expanding portion of the pressure wavefield 136 is called the "primary wavefield," which eventually reaches the formation surface 122 of the subterranean formation 120, at which point the primary wavefield may be partially reflected from the formation surface 122 and partially refracted downward into the subterranean formation 120, becoming elastic waves within the subterranean formation 120. In other words, in the body of water, the acoustic signal is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, secondary waves of significant amplitude may be generally emitted from points on or close to the formation surface 122, such as point 138, and from points on or very close to interfaces in the subterranean formation 120, such as points 140 and 142.

The secondary waves may be generally emitted at different times within a range of times following the initial acoustic signal. A point on the formation surface 122, such as the point 138, may receive a pressure disturbance from the primary wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are emitted from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the primary wavefield and secondary wavefield emitted in response to the primary wavefield may be functions of distance from the source 104 as well as the materials and physical characteristics of the materials through which the wavefields travel. In addition, the secondary expanding wavefronts may be altered as the wavefronts cross interfaces and as the velocity of sound varies in the media are traversed by the wave. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
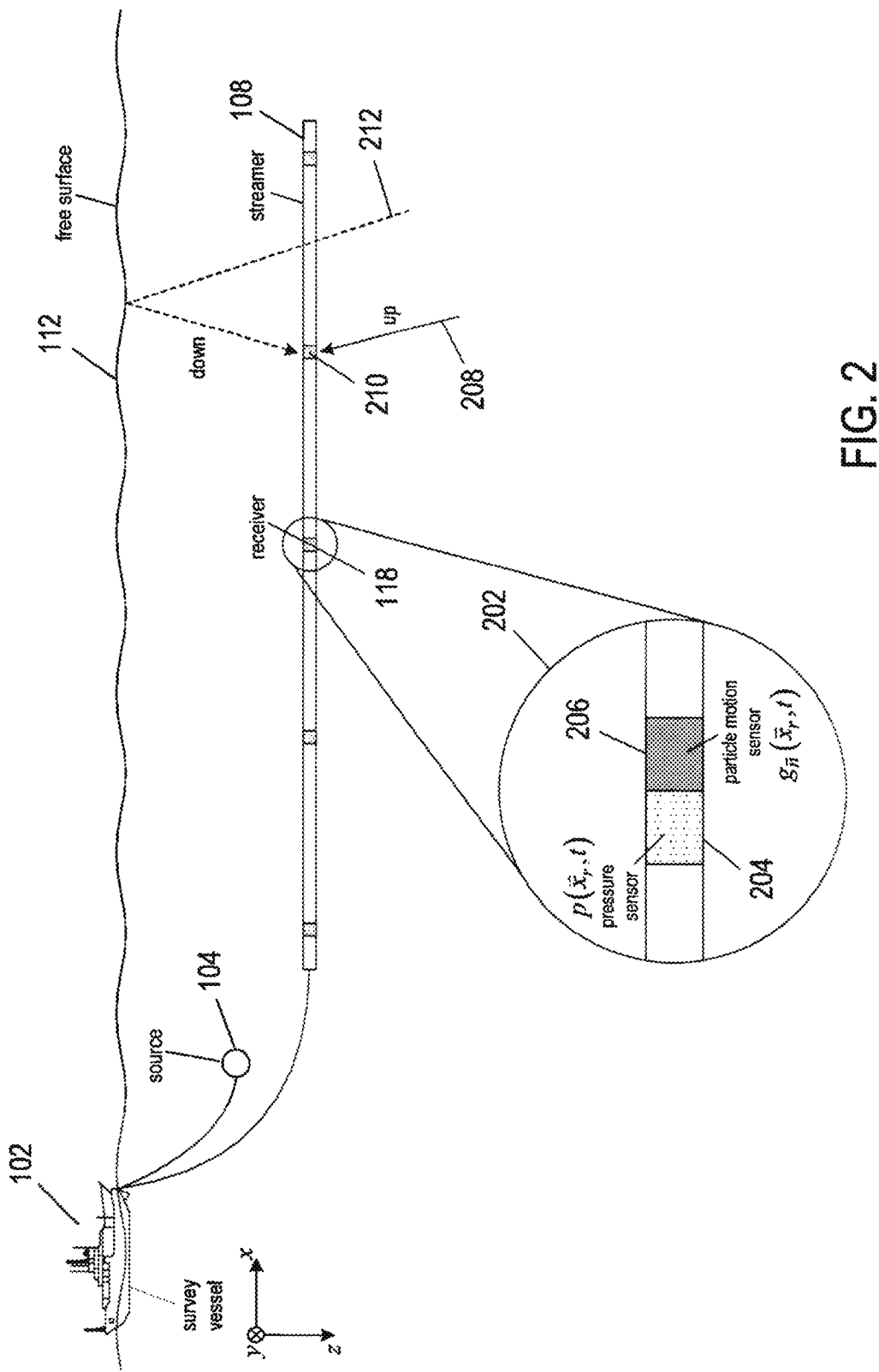
FIG. 2 shows a side-elevation view of marine seismic data acquisition system with a magnified view of a receiver.

Each receiver 118 may include a dual sensor including a particle motion sensor that detects particle motion, velocities, or accelerations over time, and a pressure sensor that detects variations in water pressure over time, or a combination of particle motion and pressure sensors. FIG. 2 shows a side-elevation view of the marine seismic data acquisition system with a magnified view 202 of the receiver 118. In this example, the magnified view 202 reveals that the receiver 118 is a dual sensor composed of a pressure sensor 204 and a particle motion sensor 206. The pressure sensor may be, for example, a hydrophone. Each pressure sensor may measure changes in hydrostatic pressure over time and may produce pressure data denoted by $p(\vec{x}, t)$, where $\vec{x}$ represents the Cartesian coordinates (x, y, z) of the receiver, and t represents time. The motion sensors may be responsive to water motion. In general, particle motion sensors detect particle motion in a direction normal to the orientation of the particle motion sensor and may be responsive to such directional displacement of the particles, velocity of the particles, or acceleration of the particles. The motion sensor data produced by the particle motion sensors may be converted to particle motion velocity data. For example, when motion sensors that are responsive to position are used, the motion sensor data denoted by $g_{\vec{n}}(\vec{x}, t)$ may be differentiated to convert the data to particle motion velocity data denoted by $v_{\vec{n}}(\vec{x}, t)$, where unit normal vector points in the direction particle motion is measured. Likewise, when motion sensors that are responsive to acceleration (i.e., accelerometers) are used, the particle acceleration data denoted by $a_{\vec{n}}(\vec{x}, t)$ may be integrated to convert the data to particle motion velocity data $v_{\vec{n}}(\vec{x}, t)$. The particle motion sensors are typically oriented so that the particle motion is measured in the vertical direction (i.e., $\vec{n}=(0,0, z)$) in which case $v_z(\vec{x}, t)$ is called the vertical velocity data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle motion in the z-direction to give $v_z(\vec{x}, t)$, each receiver may include a particle motion sensor that measures the wavefield in the in-line direction in order to obtain the inline velocity wavefield, $v_x(\vec{x}, t)$, and a particle motion sensor that measures the wavefield in the cross-line direction in order to obtain the cross-line velocity wavefield, $v_y(\vec{x}, t)$. In certain implementations, the receivers may by composed of only pressure sensors, and in other implementations, the receivers may be composed of only particle motion sensors.

Seismic data includes the pressure and particle motion data comprise the seismic data. The streamers 106-111 and the survey vessel 102 may include sensing electronics and data-processing facilities that allow seismic data generated by each receiver to be correlated with the time source is activated, absolute positions on the free surface 112, and absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically or magnetically on data-storage devices located onboard the survey vessel 102. The pressure data and particle motion data represent pressure and particle motion wavefields and, therefore, may also be referred to as the pressure wavefield and particle motion wavefield, respectively.

In FIG. 2, directional arrow 208 represents the direction of an up-going wavefield at the location of a receiver 210 and dashed arrow 212 represents a down-going wavefield produced by an up-going wavefield reflection from the free surface 112 before reaching the receiver 210. In other words, the pressure wavefield $p(\vec{x}, t)$ is composed of an up-going pressure wavefield component and a down-going pressure wavefield component, and the particle motion wavefield $g_{\vec{n}}(\vec{x}, t)$ is composed of an up-going wavefield component and a down-going wavefield component. The down-going wavefield contaminates pressure and particle motion data and creates notches in the seismic data spectral domain. Filtering may be done to remove the down-going wavefields from the pressure and particle motion data, leaving the up-going wavefields which are typically used to analyze the subterranean formation.

As explained above, each pressure sensor and particle motion sensor generates seismic data that may be stored in data-storage devices located onboard the survey vessel. The seismic data measured by each pressure sensor or motion sensor may be a time series that consist of a number of consecutively measured values called amplitudes separated in time by a sample rate. The time series measured by a pressure or motion sensor is called a "trace," which may consist of thousands of samples collected at a typical sample rate of about 1 to 5 ms. A trace is a recording of a subterranean formation response to acoustic energy that passes from an activated source, into the subterranean formation where a portion of the acoustic energy is reflected and ultimately detected by a sensor as described above. A trace records variations in a time-dependent amplitude that represents acoustic energy in the portion of the secondary wavefield measured by the sensor. In other words, each trace is a set of time-dependent pressure or motion sensor amplitudes denoted by $tr(i) = \{A(i, t_k)\}_{k=1}^{K}$, where i is the trace or receiver index, $A(i, t_k)$ is the amplitude of trace i at time sample $t_k$, and K is the number of time samples in the trace.

As explained above, the secondary wavefield typically arrives first at the receivers located closest to the sources. The distance from the sources to a receiver is called the "source-receiver offset," or simply "offset," which creates a delay in the arrival time of a secondary wavefield from a substantially horizontal interface within the subterranean formation. A larger offset generally results in a longer arrival time delay. The traces are collected to form a "gather" that can be further processed using various seismic data processing techniques in order to obtain information about the structure of the subterranean formation.

Figure 3A:
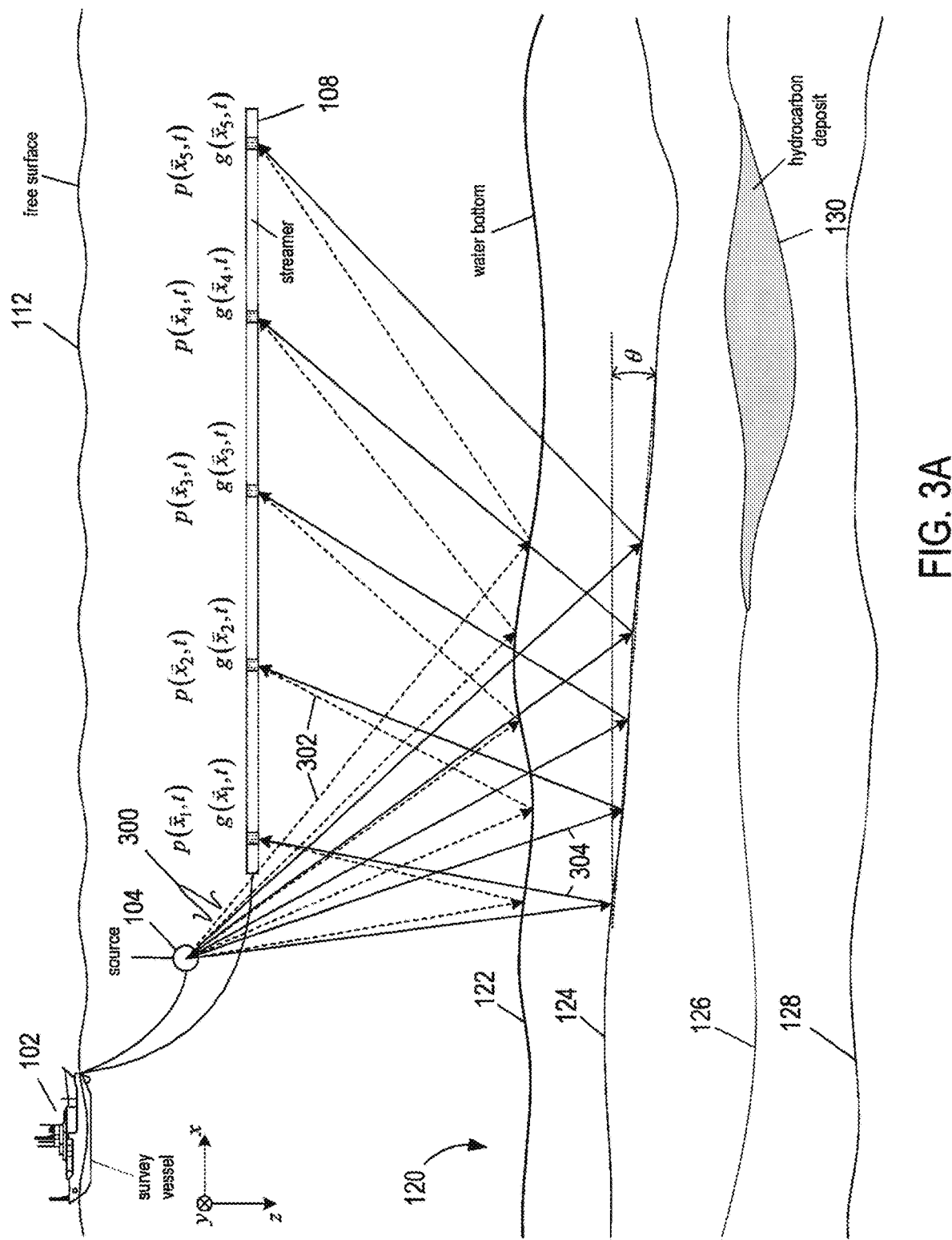
FIG. 3A shows an example of acoustic energy ray paths emanating from a source.

FIG. 3A shows example ray paths that represent paths of an acoustic signal 300 that travels from the first source 104 to or into the subterranean formation 120. Dashed-line rays, such as rays 302, represent acoustic energy reflected from the formation surface 122 to the receivers located along the streamer 108, and solid-line rays, such as rays 304, represent acoustic energy reflected from the interface 124 to the receivers located along the streamer 108. Note that for simplicity of illustration only a handful of ray paths are represented. Each pressure sensor may measure the hydrostatic pressure and each motion sensor may measure the particle motion of the acoustic energy reflected from the formation 120 or interfaces therein. The hydrostatic pressure data and/or particle motion data generated at each receiver may be time sampled and recorded as separate traces. In the example of FIG. 3A, the collection of traces generated by the receivers along the streamer 108 for a single activation of the source 104 may be collected to form a "common-shot gather" or simply a "shot gather." The traces generated by the receivers located along each of the other five streamers for the same activation may be collected to form separate shot gathers, each gather associated with one of the streamers.

Figure 3B:
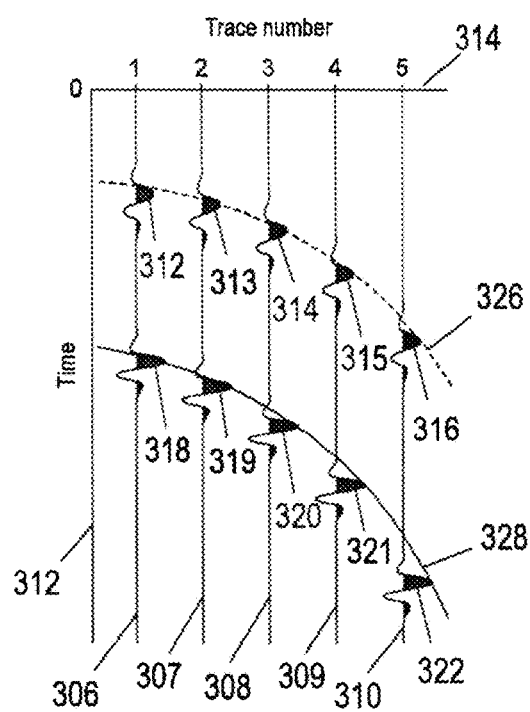
FIGS. 3B-3D shows plots of gathers.

FIG. 3B shows a plot of a shot gather composed of example traces 306-310 of the wavefield recorded by the five receives located along the streamer 108 shown in FIG. 3A. Vertical axis 312 represents time and horizontal axis 314 represents trace numbers with trace "1" representing the seismic data generated by the receiver located closest to the source 104 and trace "5" representing the seismic data generated by the receiver located farthest along the length of the streamer from the source 104. The traces 306-310 may represent variation in the amplitude of either the pressure data or the particle motion data recorded by corresponding sensors of the five receivers. The example traces include wavelets or pulses 312-316 and 318-322 that represent the up-going wavefield measured by the pressure sensors or motion sensors. Peaks, colored black, and troughs of each trace represent changes in the amplitude measured by the pressure sensors or motion sensors. The distances along the traces 306-310 from the trace number axis 314 (i.e., time zero) to the wavelets 312-316 represents two-way travel time of the acoustic energy output from the source 104 to the formation surface 122 and to the receivers located along the streamer 108, and wavelets 318-322 represents longer two-way travel time of the acoustic energy output from the source 104 to the interface 124 and to the same receivers located along the streamer 108. The amplitude of the peak or trough of the wavelets 312-316 and 318-322 indicate the magnitude of the reflected acoustic energy recorded by the receivers.

The arrival times versus source-receiver offset is longer with increasing source-receiver offset. As a result, the wavelets generated by a surface or an interface are collectively called a "reflected wave" that tracks a hyperbolic curve. For example, dashed hyperbolic curve 326 represents the hyperbolic distribution of the wavelets 312-316 reflected from the formation surface 122, which are called a "surface reflected wave," and solid hyperbolic curve 328 represents the hyperbolic distribution of the wavelets 318-322 from the interface 124, which are called an "interface reflected wave."

Figure 3C:
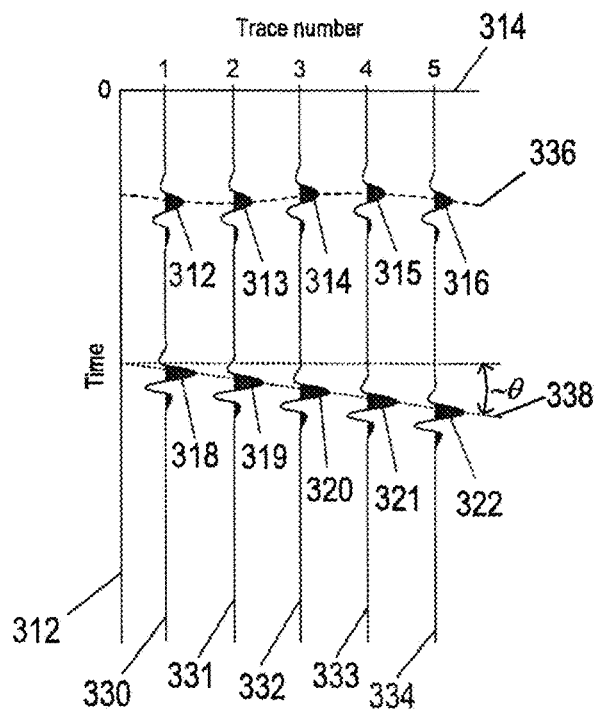

The traces from different source-receiver pairs may be corrected during seismic data processing to remove the effects of different source-receiver offsets in a process called "normal moveout" ("NMO"). FIG. 3C shows a gather of traces 330-334 after NMO has been applied to align the wavelets in time as represented by dashed-line curve 336 for the wavelets 312-316 and line 338 for the wavelets 318-323. Curve 336 approximates the curvature of the formation surface 122 below the streamer 108 shown in FIG. 3A, and line 338 approximates the curvature and dip angle θ of the interface 124 below the streamer 108 shown in FIG. 3A. The dip angle is the magnitude of inclination of a plane from horizontal. After NMO corrections, traces from different shot records with a common reflection point may be stacked to form a single trace during seismic data processing. Stacking may improve the signal-to-noise ratio, reduce noise, improve seismic data quality, and reduce the amount of data.

Figure 3D:
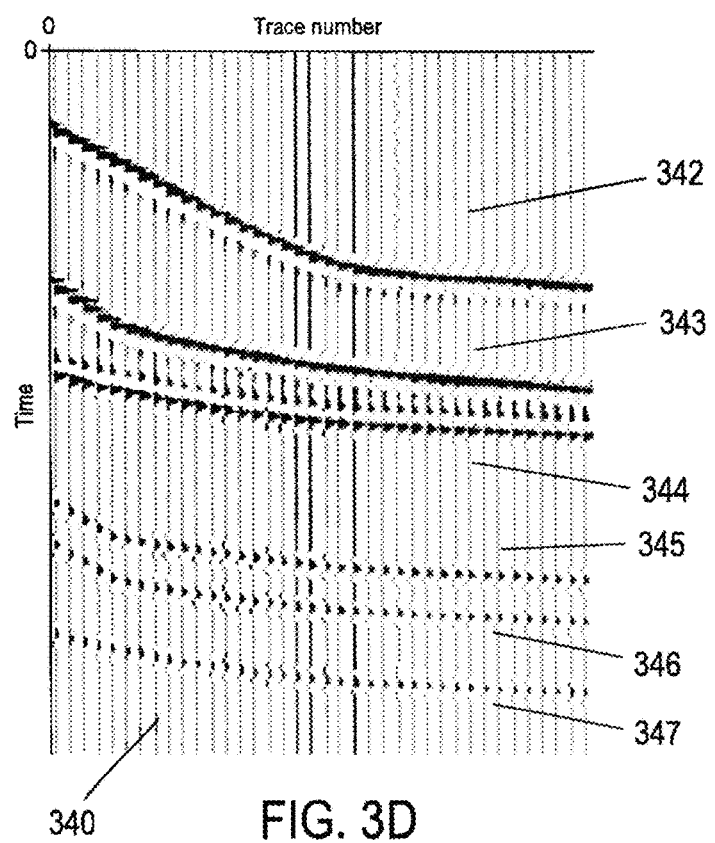

FIG. 3D shows an expanded view of a gather composed of 38 traces. Each trace, such as trace 340, varies in amplitude over time and represents acoustic energy reflected from the surface and five different interfaces within a subterranean formation as measured by a pressure sensor or a motion sensor. In the expanded view, wavelets that correspond to reflection from the same surface or interface of the subterranean formation appear chained together to form reflected waves. For example, wavelets 342 with the shortest transit time represent a surface reflected wave, and wavelets 343 represent an interface reflected wave emanating from an interface just below the surface. Reflected waves 344-347 represent reflections from interfaces located deeper within the subterranean formation.

The gathers shown in FIG. 3B-3D are described for seismic data sorted into a common-shot domain. A domain is a collection of gathers that share a common geometrical attribute with respect to the seismic data recording locations. However, implementations of the method for attenuating noise in seismic data are not limited to seismic data sorted in the common-shot domain. The seismic data may be sorted into any suitable domain for examining the features of a subterranean formation including a common-receiver domain, common-receiver-station domain, or common-midpoint domain.

Figure 4:
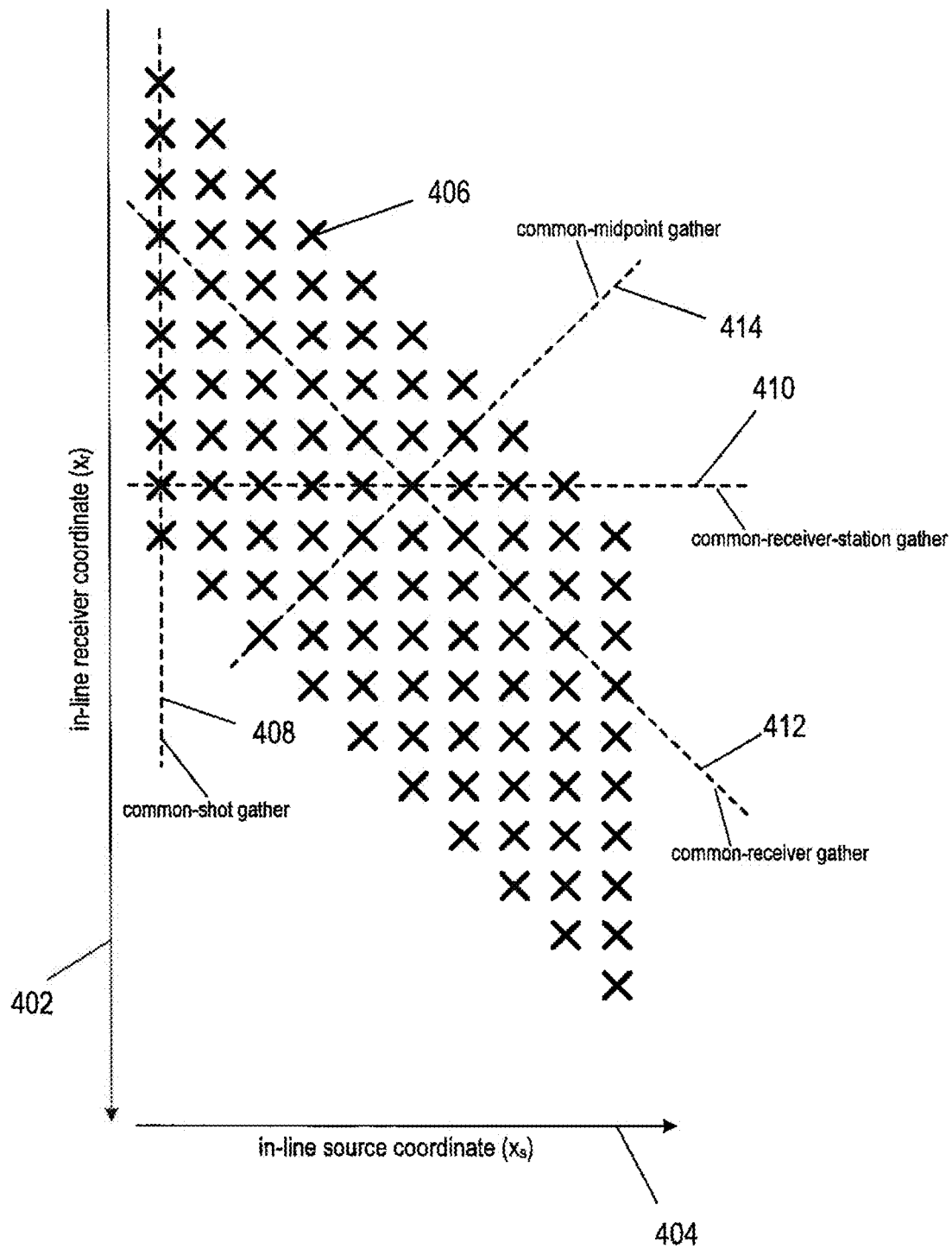
FIG. 4 shows a plot of different ways seismic data collected in a survey may be sorted into domains.

FIG. 4 shows a plot of different ways seismic data collected in a survey may be sorted into domains. Vertical axis 402 represents the in-line receiver coordinates and horizontal axis 404 represents the in-line source coordinates. X's, such as X 406, represent where a recording (i.e., pressure or particle motion) has taken place. In this plot, a column of recordings identified by dashed line 408 represents a shot gather, and a row of recordings identified by dashed line 410 represents a common-receiver-station gather. Recordings collected along a diagonal represented by dashed line 412 is a common-receiver gather, and recordings collected along a diagonal represented by dashed line 414 is a common-midpoint gather. The gathers form different domains. For example, the shot gathers form a shot domain, the common-receiver gathers form a common-receiver domain, the common-receiver-station gathers form a common-receiver-station domain, and the common-midpoint gathers form a common-midpoint domain. Certain domains are orthogonal. For example, as shown in FIG. 4, the gathers in the shot domain are orthogonal to the gathers in the common-receiver domain.

In practice, a typical trace does not record just primary reflections from a surface of, or interface within, a subterranean formation, as represented in FIGS. 3B-3D. In practice, a trace may record the time-dependent amplitude of acoustic energy associated with numerous reflections of acoustic energy from within the subterranean formation and the free surface 112. Secondary wavefronts that travel directly from the formation surface 122 or from a subterranean interface to the receivers without experiencing reflections from the free surface 112 or other interfaces are called "primary reflections" or simply "primaries." On the other hand, because the free surface 112 may act as a near perfect reflector of acoustic energy, secondary wavefronts that bounce back and forth between the free surface 112 and the subterranean formation before being detected by the receivers are called "surface-related multiples." Another type of multiple reflection is generated by sound waves reflected within the subterranean formation but have no reflections from the free surface 112. The multiple reflections that take place within the subterranean formation are called "internal multiples."

Figure 5:
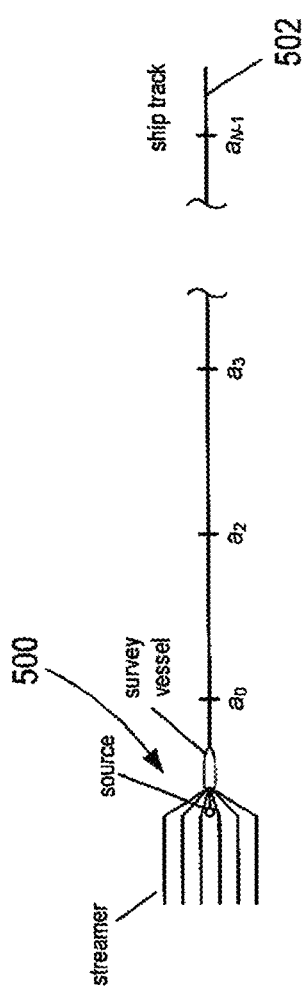
FIG. 5 shows a marine seismic data acquisition system towing a source and six separate streamers along a ship track.

Frequently, a survey vessel travels at a constant speed (rate and direction) and the source may be activated at regular time intervals resulting in equally spaced activation sites along planned ship tracks in a survey. However, changing environmental conditions, such as changes in the weather, currents, water surface conditions, and wind direction, affect the speed of the survey vessel which, in turn, may cause unsynchronized variation in the distance between activation sites and time intervals between activation of the source. FIG. 5 shows a marine seismic data acquisition system 500 composed of a survey vessel towing a source and six separate streamers along a straight ship track 502. While the survey vessel follows the ship track 502, the source may be activated at N activation sites denoted by $a_0$ through $a_{N-1}$. Because of changing environmental conditions, the distance between activation sites may vary. The survey vessel includes global positioning instruments that record the survey vessel location and the location of the source and receivers at each activation site. In practice, the survey vessel is not limited to traveling a straight-line ship track. Ship tracks may be curved or circular or be any other suitable non-linear path. Instruments onboard the survey vessel also record the times at which the source is activated with up to about six places of accuracy.

For operational efficiency, marine seismic surveys are typically planned to minimize the distance between activation sites and the time intervals between activations of the source. Although acoustic energy emanating from a subterranean formation gradually weakens, this acoustic energy may be recorded as noise in the seismic data recorded for a subsequent activation of the source. As a result, time intervals between activations of the source are traditionally selected to minimize the acoustic energy that lingers after each activation of the source.

Figure 6:
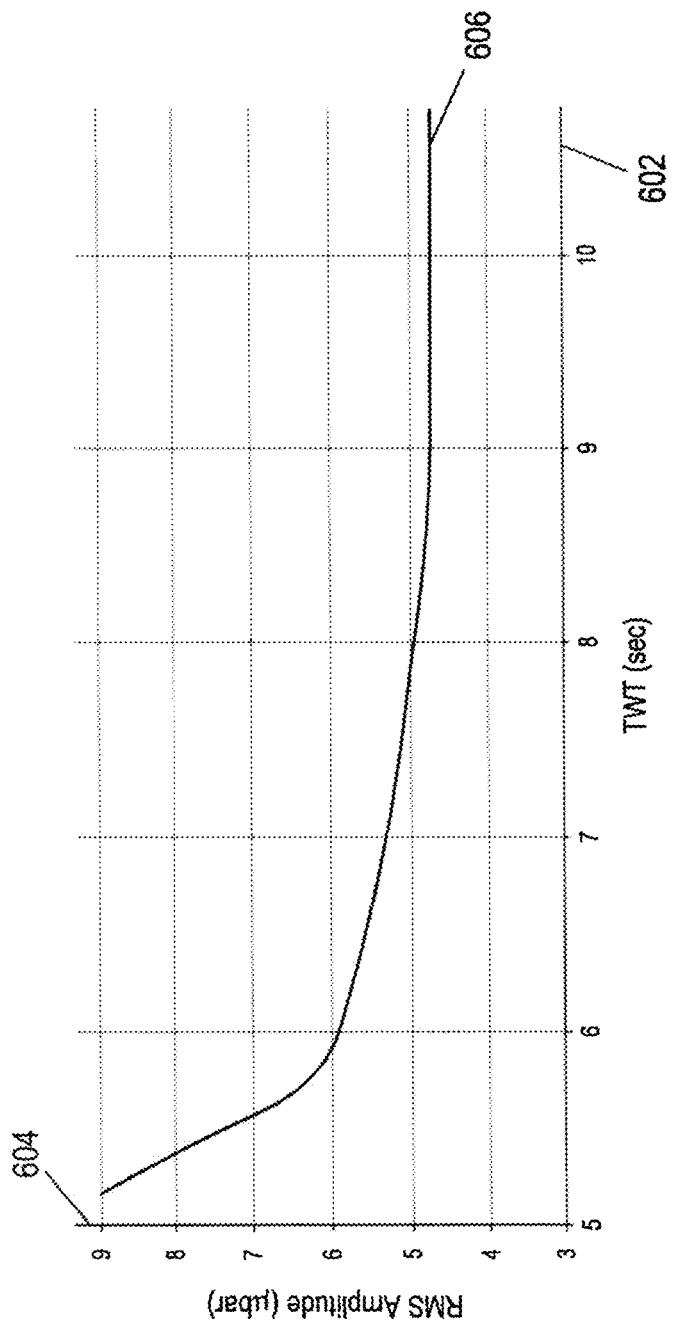
FIG. 6 shows a plot of typical acoustic energy decay versus time following activation of a source.

FIG. 6 shows a plot of typical acoustic energy decay versus time following activation of a source. Horizontal axis 602 represents two-way time ("TWT") in seconds, vertical axis 604 represents root-mean square amplitude of acoustic energy in microbars, and curve 606 represents acoustic energy decay. In this example, curve 606 reveals a rapid decrease in acoustic energy between about 5 and 7 seconds and a minimum is reached about 9 seconds. Subtracting about 1 second to account for the average water bottom depth in TWT gives a time interval between activations (i.e., cycle time) of about 8 seconds for a survey vessel traveling at about 4.7 to 4.8 knots.

Methods and systems are described for attenuating the noise associated with RAE recorded in seismic data, which allows for much shorter time intervals between activations than traditional minimum time intervals between source activations that are based on a minimum RAE. Seismic data may be continuously recorded along a ship track, or recorded in separate gathers after each activation of a source, and the seismic data is aligned in time from activation to activation. Methods and systems are based on unsynchronized variation in the time intervals between activations. This unsynchronized variation in the time intervals may be the result of changing environmental conditions that affect the speed of the survey or intentional randomized or pseudo-randomized source activation times.

Figure 7:
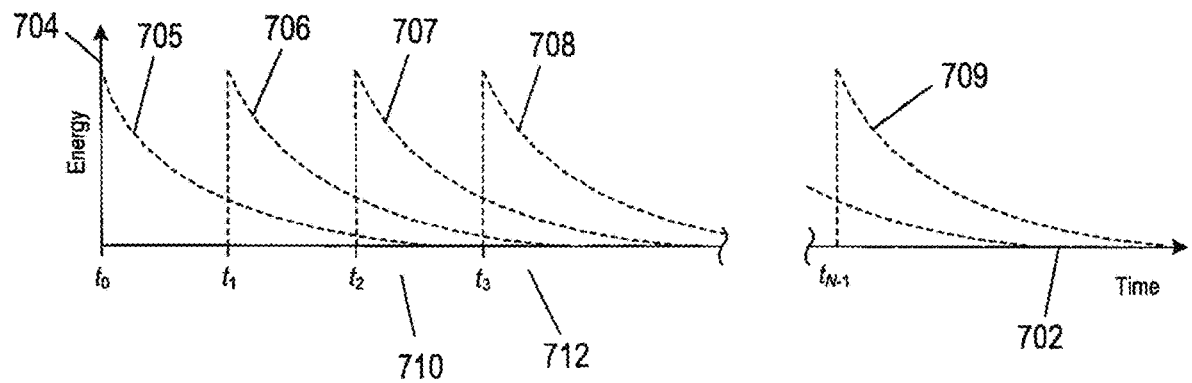
FIG. 7 shows a plot of acoustic energy decay for a series of source activations.

FIG. 7 shows a plot of acoustic energy versus time for N source activations. Horizontal axis 702 represents time, and vertical axis 704 represents acoustic energy. The times at which the source is activated along a ship track, such as the ship track 502, are denoted by $t_0$ through $t_{N-1}$. Exponentially decaying dashed curves 705-709 represent the decay of acoustic energy after each activation of the source. Acoustic energy present in a subsequent time interval between activations is RAE. For example, RAE that results from activation of the source at time $t_1$ is present in the time interval 710 after $t_2$ and RAE that results from activation of the source at time 6 is present in the time interval 712 after $t_3$.

Figure 8:
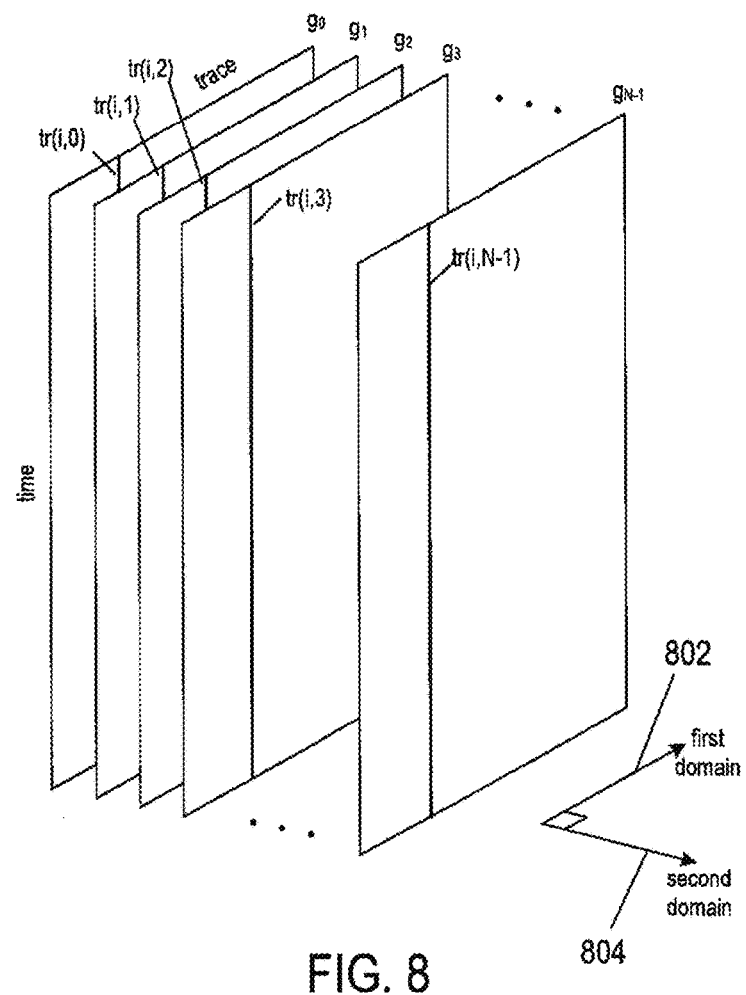
FIG. 8 shows consecutively recorded gathers.

FIG. 8 shows N consecutively recorded gathers denoted by $g_0$ through $g_{N-1}$. The recorded gathers $g_0$ through $g_{N-1}$ are composed of traces of seismic data recorded immediately after each activation of a source at corresponding activation times $t_0$ through $t_{N-1}$ in FIG. 7. For example, gather $g_0$ represents seismic data recorded immediately after activation of the source at time $t_0$ and gather $g_1$ represents seismic data recorded immediately after activation of the source at time $t_1$. In certain implementations, the gathers $g_0$ through $g_{N-1}$ may be recorded separately immediately after each activation of the source, in which case the time intervals between source activations is greater than recording time used to record each gather immediately after a source activation. The recording times in which the gathers $g_0$ through $g_{N-1}$ are recorded may vary. In other implementations, the gathers $g_0$ through $g_{N-1}$ may represent partitioned, continuously recorded seismic data. In other words, although the gathers are shown separately, the gathers $g_0$ through $g_{N-1}$ may be generated from partitioning continuously recorded seismic data obtained for N source activations along a ship track, such as the ship track 502 in FIG. 5. For example, the gathers $g_0$ and $g_1$ together may be a continuous record of seismic data that is partitioned at source activation time $t_1$ into the separate gathers $g_0$ and $g_1$. As a result, the time interval between two consecutive source activations is substantially equal to the time interval in which a corresponding gather is recorded while continuously recording seismic data along a ship track. For example, gather $g_0$ represents seismic data recorded in a time interval between $t_0$ and $t_1$, which also corresponds to the time interval between sources activation times $t_0$ and $t_1$. Because the time intervals between source activations may vary, the recording times associated with the gathers $g_0$ through $g_{N-1}$ may vary. Each of the gathers includes noise associated with RAE from a previous activation of the source, except for the gather $g_0$. The gathers $g_0$ through $g_{N-1}$ are composed of n traces denoted by tr(i,j), where i is a trace index from 1 to n and j is a gather index from 0 to N−1. The gathers are in a first domain 802 while the traces with the same trace index i but different gather index j are in a second domain 804 that is orthogonal to the first domain 802. For example, the gathers $g_0$ through $g_{N-1}$ may be consecutively recorded shot-domain gathers while the set of traces {tr(i, j)}$_{j=0}^{N-1}$ are in the receiver domain, which is orthogonal to the shot domain.

Although the time interval between activations may vary, primaries and multiples in consecutively recorded gathers $g_1$ through $g_{N-1}$ are aligned in time while RAE associated with previous activations of the source are not aligned. FIGS. 9A-9C show examples of three consecutively recorded shot gathers $g_{j-2}$, $g_{j-1}$, and $g_j$ obtained for three consecutive source activations. The gathers $g_{j-2}$, $g_{j-1}$, and $g_j$ may have been obtained while continuously recording seismic data during three consecutive source activations or the gathers $g_{j-2}$, $g_{j-1}$, and $g_j$ may be of separately recorded seismic data recorded after three consecutive source activations. The gathers include trace axes 902 and time axes 904. Curves, such as curve 906 in FIG. 9A, represent reflected wavefronts from a formation surface and interfaces of a subterranean formation as described above with reference to FIG. 3C. Zero time 908 along the time axes marks activation time of the source. In this example, the gathers $g_{j-2}$, $g_{j-1}$, and $g_j$ record primaries, such as primaries 910, that begin to appear at about the same time $t_p$ after activation of the source, and multiples, such as multiples 912, that begin to appear at about the same time $t_m$ after activation of the source. The gathers $g_{j-2}$, $g_{j-1}$, and $g_j$ also record reflected wavefronts, such as reflected wavefronts 914 and 916 in FIG. 10A 9A, that may appear throughout the gather, overlapping the primaries and multiples, but for the purposes of illustration appear earlier in time than the primaries in this case. These reflected wavefronts represent RAE emanating from the subterranean formation for one or more preceding source activations and are considered noise in the recorded gathers $g_{j-2}$, $g_{j-1}$, and $g_j$. Because the primaries and multiples are recorded at the same times $t_p$ and $t_m$, respectively, after activation of the source, the primaries and multiples are approximately aligned in time and coherent between the consecutively recorded gathers $g_{j-2}$, $g_{j-1}$, and $g_j$. On the other hand, because of unsynchronized variations in the time intervals between three consecutive activations of the source used to generate the gathers $g_{j-2}$, $g_{j-1}$, and $g_j$, the residual reflections are not aligned in time and are incoherent between the gathers $g_{j-2}$, $g_{j-1}$, and $g_j$.

Figure 10:
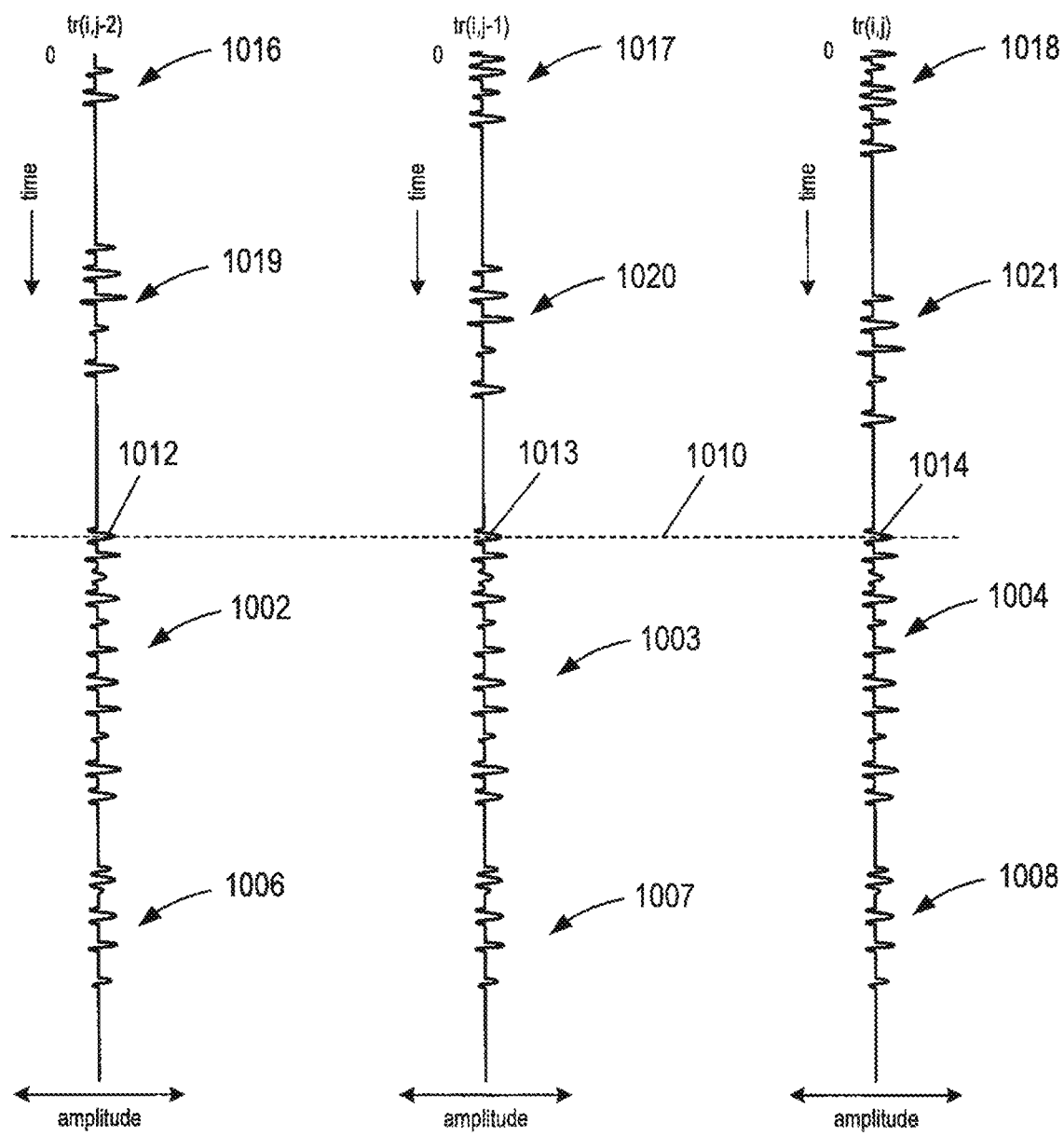
FIG. 10 shows three examples traces.

FIG. 10 shows three examples traces $tr(i,j-2)$, $tr(i,j-1)$, and $tr(i,j)$ represented by lines 918-920 in the corresponding gathers $g_{j-2}$, $g_{j-1}$, and $g_j$. Wavelets 1002, 1003, and 1004 correspond to primaries and wavelets 1006, 1007, and 1008 correspond to multiples, which are aligned in time the traces $tr(i,j-2)$, $tr(i,j-1)$, and $tr(i,j)$. For example, dashed line 1010 passes through wavelets 1012, 1013, and 1014 and crosses the traces $tr(i,j-2)$, $tr(i,j-1)$, and $tr(i,j)$ at the same time. By contrast, as shown in FIG. 10, wavelets 1016-1021 corresponding to RAE are not aligned in time between the gathers $g_{j-2}$, $g_{j-1}$, and $g_j$.

In order to remove noise associated with residual reflections recorded in consecutively recorded shot-domain gathers, the gathers may be aligned in time with respect to the RAE. As a result, incoherent RAE in the originally recorded receiver-domain gathers becomes coherent in aligned receiver-domain gathers, and coherent primaries and multiples in the original receiver-domain gathers become incoherent in the aligned receiver-domain gathers. Aligning the gathers in time may be accomplished by adding a time difference based on the independently varying but known times $t_0$ through $t_{N-1}$.

FIG. 11 shows an example time line 1102 with source activation times $t_0$ through $t_{N-1}$ and time intervals between source activations denoted by $\Delta t_j = t_j - t_{j-1}$ for $1 \le j \le N-1$. The durations of the time intervals $\Delta t_j$ between source activations vary, which may be due to changing environmental conditions in which the survey is conducted, or due to randomized or pseudo-randomized activation of the source. In one implementation, a gather may be selected from the consecutively recorded gathers, and the remaining gathers may be aligned in time with respect to the selected gather by time shifting the traces of the non-selected gathers according to:

$$Tr(i,j) = \{A(i,j,t_k + \delta t_j)\}_{k-1}^K \quad (1)$$

where
$\delta t_j = \Delta t_{selected} - \Delta t_j$ for $j \ge 1$; and
$\Delta t_{selected}$ is selected from the set $\{\Delta t_j\}_{j=1}^{N-1}$.
Note that because source activations begin at $t_0$, there should be no acoustic energy from a previous shot in the seismic data recorded in the gather $g_0$, but the gathers that form the set $\{g_j\}_{j=1}^{N-1}$ include acoustic energy from one or more previous activations. As a result, $\Delta t_{selected}$ may be selected from the set $\{\Delta t_j\}_{j=1}^{N-1}$.

FIG. 12 shows N-1 aligned gathers $G_1$ through $G_{N-1}$ that correspond to the recorded gathers $g_1$ through $g_{N-1}$. Time shifting according to Equation (1) may align RAE between the gathers $G_1$ through $G_{N-1}$ in the second domain 1204 orthogonal to the first domain 1202, while the primaries and multiples may be not aligned. For example, RAE events on time-shifted traces $\{Tr(i,j)\}_{j=1}^{N-1}$ are aligned in the second domain 1204, but the primaries and multiples are not aligned in the second domain 1204. The aligned RAE events may then be separated from the de-aligned primaries, multiples and incoherent noise in traces $\{Tr(i,j)\}_{j=1}^{N-1}$ using a coherency-based separation method 1206, such as f-x deconvolution, in the second domain 1304 to form a set of N-1 corresponding model acoustic energy ("MAE") gathers $G'_1$ through $G'_{N-1}$ composed of model traces, denoted by $M(i,j)$, that represent aligned RAE and attenuated primaries and multiples.

Figure 13C:
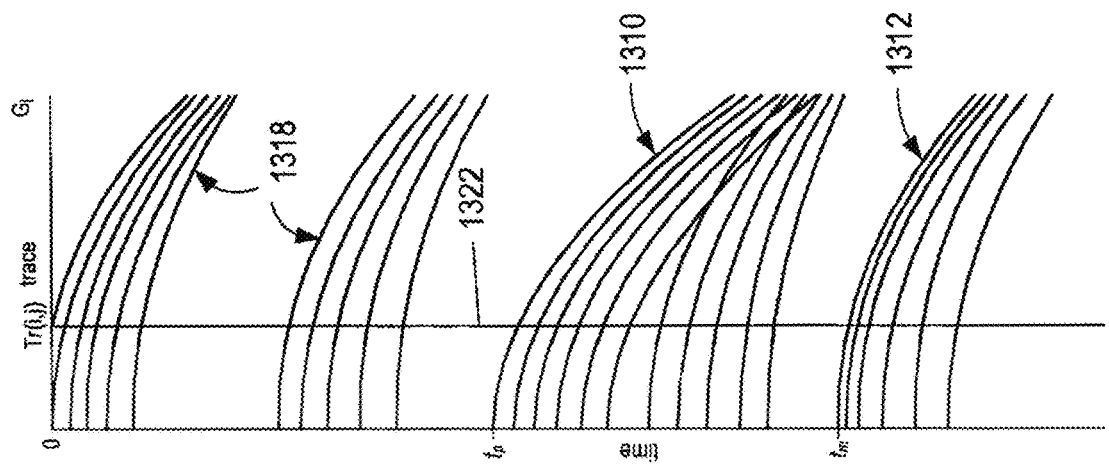
FIGS. 13A-13C show three examples of noise aligned shot gathers.
Figure 13B:
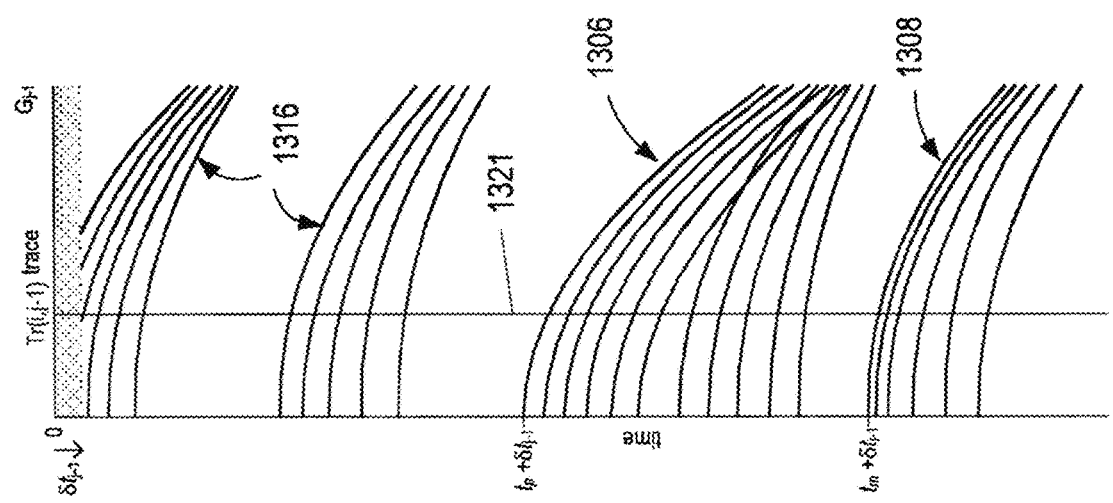
Figure 13A:
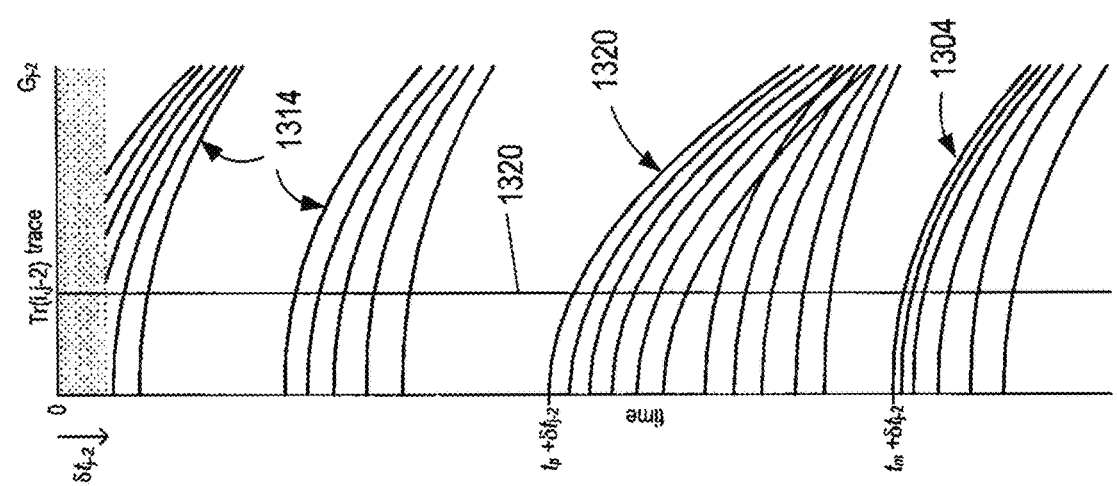

FIGS. 13A-13C show three examples of aligned shot gathers $G_{j-1}$, and $G_j$ that correspond to the shot gathers $g_{j-2}$, $g_{j-1}$, and $g_j$. In this example, the aligned shot gathers $G_{j-2}$ and $G_{j-1}$ shown in FIGS. 13A and 13B, respectively, are time shifted with respect to selected gather $G_j$, which is the gather $g_j$ in FIG. 9C. The primaries 1302 and multiples 1304 in the gather $G_{j-2}$ and the primaries 1306 and multiples 1308 in the gather $G_{j-1}$ are not aligned in time and are not aligned in time with the primaries 1310 and multiples 1312 in the selected gather $G_j$. On the other hand, RAE 1314 in the gather $G_{j-2}$ and RAE 1316 in the gather $G_{j-1}$ are aligned in time and are aligned in time with RAE 1318 in the selected gather $G_j$.

Figure 14:
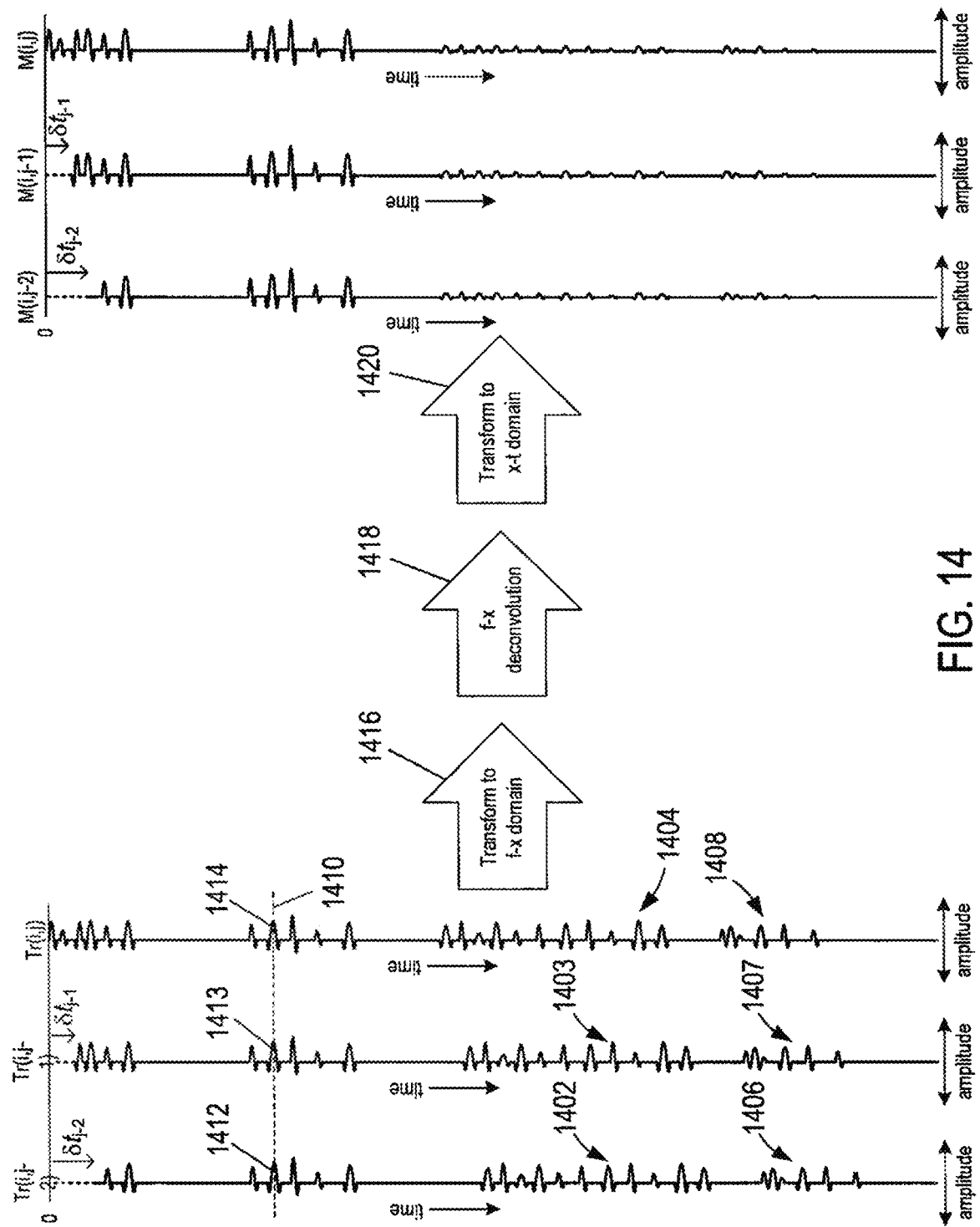
FIG. 14 shows three example traces.

FIG. 14 shows three example traces $Tr(i,j-2)$, $Tr(i,j-1)$, and $Tr(i,j)$ represented by lines 1320-1322 in corresponding noise aligned gathers $G_{j-2}$, $G_{j-1}$, and $G_j$. As shown in FIG. 14, wavelets 1402, 1403, and 1404 that correspond to primaries and wavelets 1406, 1407, and 1408 that correspond to multiples are not aligned in time for the traces $Tr(i,j-2)$, $Tr(i,j-1)$, and $Tr(i,j)$. On the other hand, wavelets that correspond to RAE are aligned in time. For example, dashed line 1410 passes through wavelets 1412, 1413, and 1414 and crosses the traces $Tr(i,j-2)$, $Tr(i,j-1)$, and $Tr(i,j)$ at the same time.

FIG. 14 also shows a method for generating model traces in MAE gathers $G'_1$ through $G'_{N-1}$ from receiver domain traces $Tr(i,j-2)$, $Tr(i,j-1)$, and $Tr(i,j)$. The method attenuates the unaligned primaries and multiples while the aligned RAE is retained in the model traces of the MAE gathers $G'_1$ through $G'_{N-1}$. The traces $Tr(i,j-2)$, $Tr(i,j-1)$, and $Tr(i,j)$ are transformed at 1416 from the space-time domain, x-t, to the frequency-space domain, f-x, using an x-t to f-x transform, such as a fast Fourier transform, a Laplace transform, or a z-transform. In the f-x domain, f-x deconvolution at 1418 may be applied using a Wiener-Levinson prediction filter or an $L_2$ Norm Adaptive prediction filter. With f-x deconvolution, the prediction filters may predict each trace from neighboring traces. In this case, the de-aligned primaries and multiples may be attenuated by virtue of their lack of coherency in the receiver domain, while the aligned RAE is coherent and predictable, and thus may be retained. After f-x deconvolution at 1418, the spectra are transformed at 1420 back to the x-t domain using an inverse f-x to x-t transform, such an inverse fast Fourier transform, an inverse Laplace transform, or an inverse z-transform, to give model traces $M(i,j-2)$, $M(i,j-1)$, and $M(i,j)$ that correspond to aligned traces $Tr(i,j-2)$, $Tr(i,j-1)$, and $Tr(i,j)$. In the example model traces, the primaries and multiples may be attenuated and the RAE may be retained.

Extraction of a coherent RAE model by prediction from surrounding data with attenuation of incoherent energy is not limited to the f-x domain method described above with reference to FIG. 14. In other implementations, coherent MAE gathers may be calculated using other prediction methods in Radon or f-k space or in the original x-t domain. Suitable event-coherency-based algorithms are not limited to spatial deconvolution, but may include trend-fitting and energy minimization procedures, and optimal estimation methods such as the Kalman filter.

Model traces may be calculated for each trace index and collected to form MAE gathers $G'_1$ through $G'_{N-1}$ shown in FIG. 12. The model traces in the MAE gathers $G'_1$ through $G'_{N-1}$ may be time adjusted so that the MAE may be aligned in time with the RAE in the corresponding recorded gathers $g_1$ through $g_{N-1}$. When seismic data is continuously recorded, MAE gathers may also be stored and used to enhance seismic data associated with a previous source activation by preservation of diffraction tails through to migration and imaging using multiples.

As shown in FIG. 12, each of the MAE model gathers $G'_1$ through $G'_{N-1}$ is composed of a set of model traces $\{M(i,j)\}_{i=1}^n$ that may be time adjusted and subtracted from corresponding recorded gathers $g_1$ through $g_{N-1}$ to generate gathers with attenuated RAE $g_1^{att}$ through $g_{N-1}^{att}$. In one implementation, in order to subtract MAE from a recorded gather $g_j$, the model traces $\{M(i,j)\}_{i=1}^n$ comprising MAE model gather $G'_j$ are aligned in time with the RAE in the gather $g_j$ to give time-adjusted model traces given by:

$$M^{adj}(i,j) = \{B(i,j,t_k-\delta t_j)\}_{k=1}^K \quad (2)$$

where $B(i,j,t_k-\delta t_j)$ represents the amplitude of the model trace with trace index i at time sample $t_k-\delta t_j$, The set of time-adjusted traces $\{M^{adj}(i,j)\}_{i=1}^n$ may be collected to form the time-adjusted gather $g_j^{adj}$. The time-adjusted gather $g_j^{adj}$ may be subtracted from the recorded gather $g_j$ to give RAE attenuated gather $g_j^{att}$. The RAE attenuated gather $g_j^{att}$ includes essentially the same primaries and multiples as the recorded gather $g_1$ but with attenuated RAE.

Figure 15B:
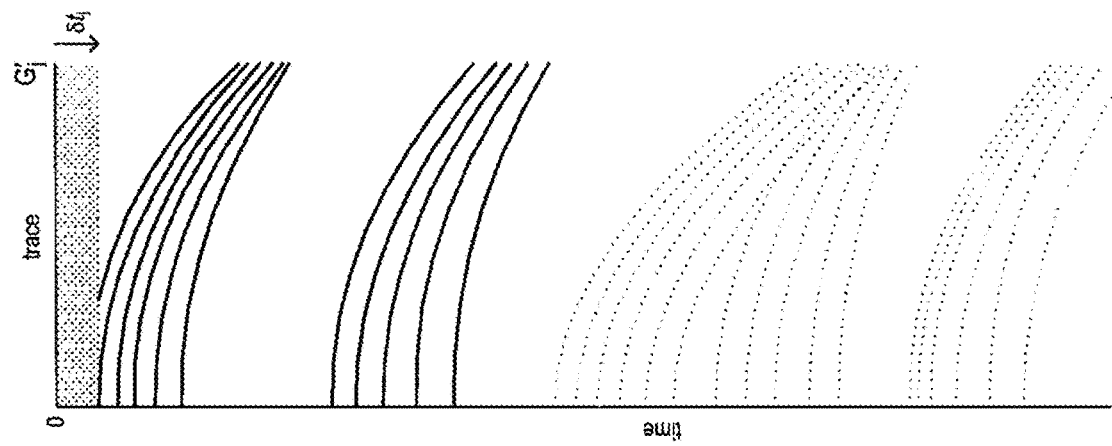
FIGS. 15A-15D shows the example gather described above with reference to FIG. 10C.
Figure 15A:
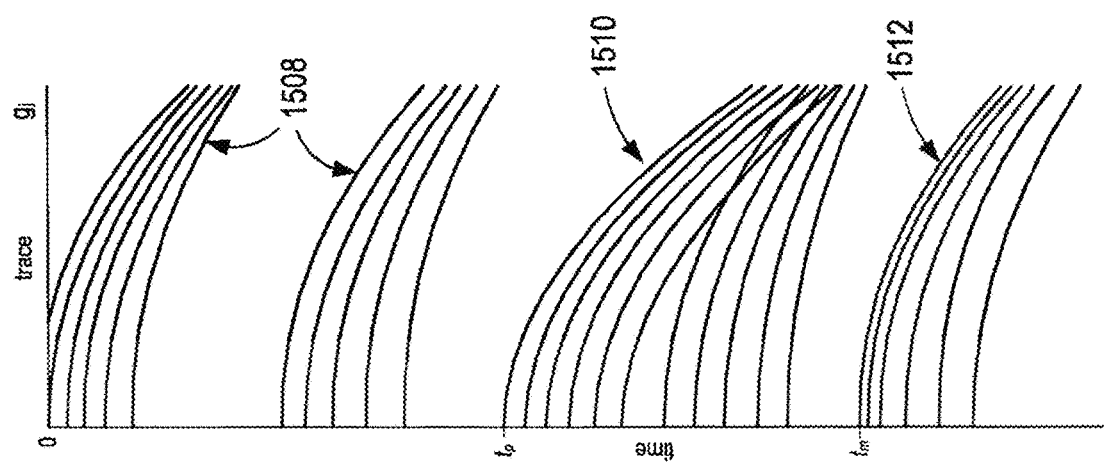
Figure 15D:
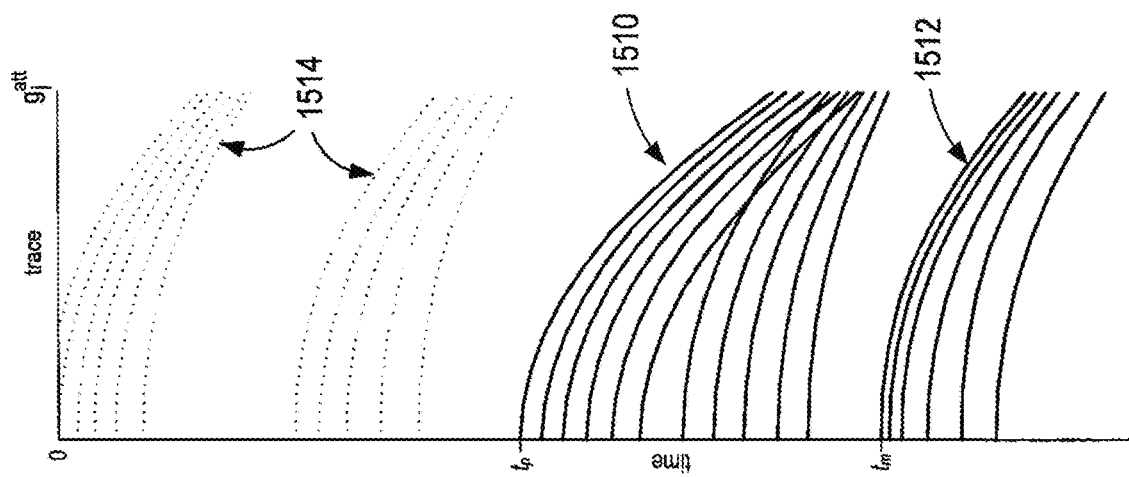
Figure 15C:
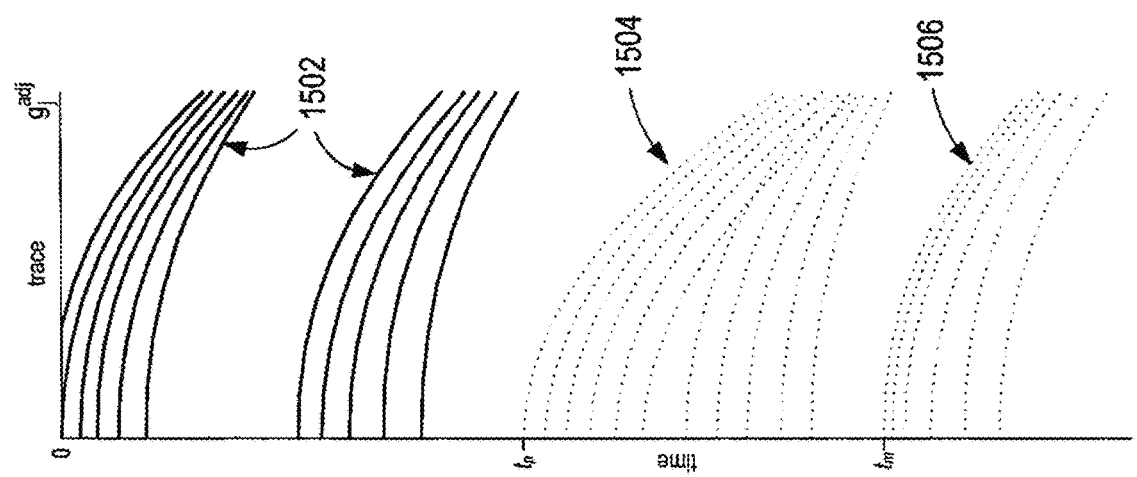

FIG. 15A shows the example recorded gather $g_j$ described above with reference to FIG. 9C. FIG. 15B shows an example of an MAE gather $G'_j$ that corresponds to the recorded gather $g_j$. The MAE gather $G'_j$ is one of the MAE gathers $G'_1$ through $G'_{N-1}$ obtained as described above with reference to FIGS. 12-14. FIG. 15C shows a time-adjusted gather $g_j^{adj}$ that is aligned in time with the gather $g_j$. The time-adjusted gather $g_j^{adj}$ may be determined from the MAE gather $G'_j$ using Equation (2). The time-adjusted gather $g_j^{adj}$ shown in FIG. 15C is a time-aligned model of the RAE portion of the recorded gather $g_j$ shown in FIG. 15A. As shown in FIG. 15C, solid curves 1502 represent RAE, and dotted curves 1504 and 1506 represent attenuated primaries and multiples, respectively. The RAE 1502 and attenuated primaries 1504 and multiples 1506 of the time-adjusted gather $g_j^{adj}$ may be aligned in time with RAE 1508, primaries 1510, and multiples 1512 of the recorded gather $g_j$, shown in FIG. 15A. The time-adjusted gather $g_j^{adj}$ may be subtracted from the recorded gather $g_j$ to give RAE attenuated gather $g_j^{att}$ shown in FIG. 15D. In FIG. 15D, dotted curves 1514 represent attenuated RAE, and the primaries 1510 and multiples 1512 are substantially retained, improving the signal-to-noise ratio in the RAE attenuated gather $g_j^{att}$ over the recorded gather $g_j$. Once a set of RAE attenuated gathers $\{g_j^{att}\}_{j=1}^{N-1}$ have been generated, the gathers $\{g_j^{att}\}_{j=1}^{N-1}$ may be subjected to other seismic data processing techniques such as stacking and migration.

In addition to spatial prediction from record to record of RAE events independently of any information from primary events, as described above (the same RAE event corresponding to the same propagation path in the Earth from record to record), the RAE model may be built by temporal prediction of later events based on earlier primary and multiple events. It is common practice to use wave-equation methods or surface-related-multiple-elimination methods within a single recording period in various domains in order to predict a model of multiple energy to subtract from the later part of the record. The scope of the present disclosure includes an extension of such a prediction beyond the end of a single record, so that an RAE event in the next record may be estimated independently of the corresponding RAE in the adjacent records.

Figure 16:
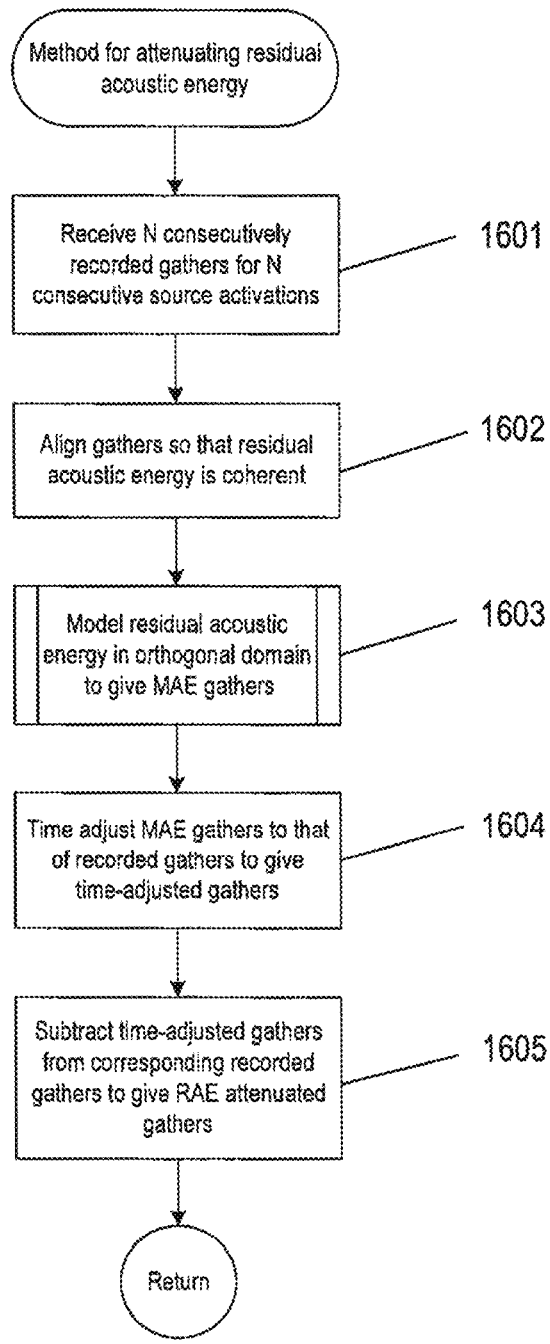
FIG. 16 shows a flow-control diagram of a method for attenuating residual acoustic energy.

FIG. 16 shows a flow-control diagram of a method for attenuating RAE. In block 1601, N gathers recorded for N consecutive source activations are received as described above with reference to FIGS. 8 and 9. The N recorded gathers have RAE from previous source activations. In block 1602, N-1 time-aligned gathers may be generated from the N recorded gathers such that RAE is substantially aligned in time (i.e., RAE is coherent) between the N-1 time-aligned gathers and primaries and multiples recorded are not aligned in time across the N-1 time-aligned gather using Equation (1), as described above with reference to FIG. 13. In block 1603, a routine "model RAE in orthogonal domain" to the domain of the gathers is called to generate N-1 MAE gathers. In block 1604, the MAE gathers may be time aligned with the corresponding recorded gathers using Equation (2) to given time-aligned gathers. In block 1605, the time-aligned gathers may be subtracted from the corresponding recorded gathers to give a RAE attenuated gathers, as described above with reference to FIG. 15.

Figure 17:
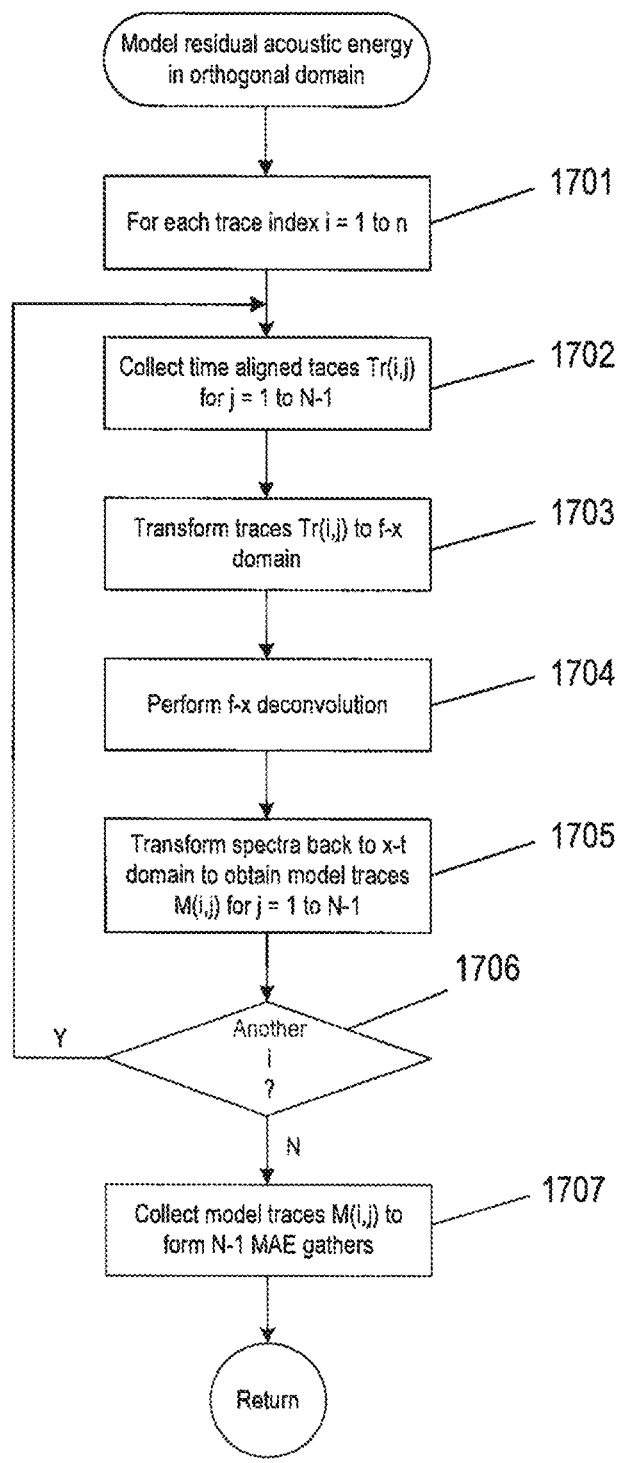
FIG. 17 shows a flow-control diagram of a routine "model residual acoustic energy in orthogonal domain" called in block 1703 of FIG. 17.

FIG. 17 shows a flow-control diagram of the routine "model residual acoustic energy in orthogonal domain" called in block 1603 of FIG. 16. In block 1701, a for-loop repeats the operations associated with blocks 1702-1706 for each trace index i ranging from 1 to n, where n is the number of traces in each of the N recorded gathers. In block 1702, time-aligned traces Tr(i,j) for gather index j ranging from 1 to N-1 are collected from the N-1 time-aligned gathers, as described above with reference to FIGS. 12-14. The set of time-aligned traces $\{Tr(i,j)\}_{j=1}^{N-1}$ are in a domain that is substantially orthogonal to the domain of the original N recorded gathers. In block 1703, the set of time-aligned traces $\{Tr(i,j)\}_{j=1}^{N-1}$ are transformed from the x-t domain to the f-x domain for example, using a fast Fourier transform, Laplace transform, or a z-transform. In block 1704, f-x deconvolution may be applied in order to predict the coherent component at each frequency, consisting of aligned RAE. In block 1705, the spectra are transformed from the f-x domain to the x-t domain to give N-1 model traces $\{M(i,j)\}_{j=1}^{N-1}$ that substantially include the RAE and attenuated primaries and multiples. In block 1706, when the operations in blocks 1702-1705 have been repeated for each of the n traces, control flows to block 1707. In block 1707, model traces $\{M(i,j)\}_{i=1}^n$ are collected to form N-1 MAE gathers, as described above with reference to FIG. 13.

Figure 18A:
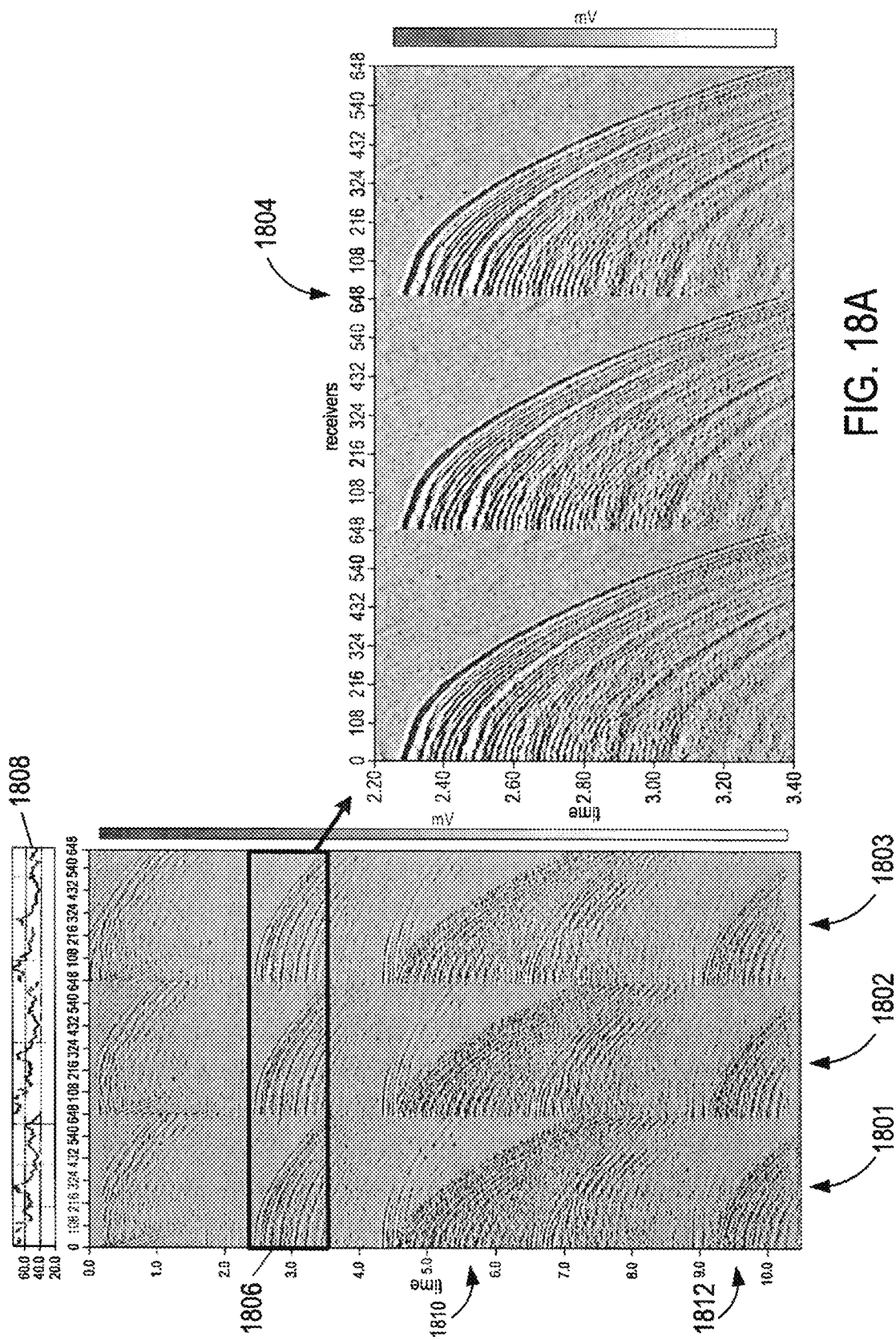
FIGS. 18A-18C show an example of residual acoustic energy attenuated in three synthetic shot gathers.
Figure 18B:
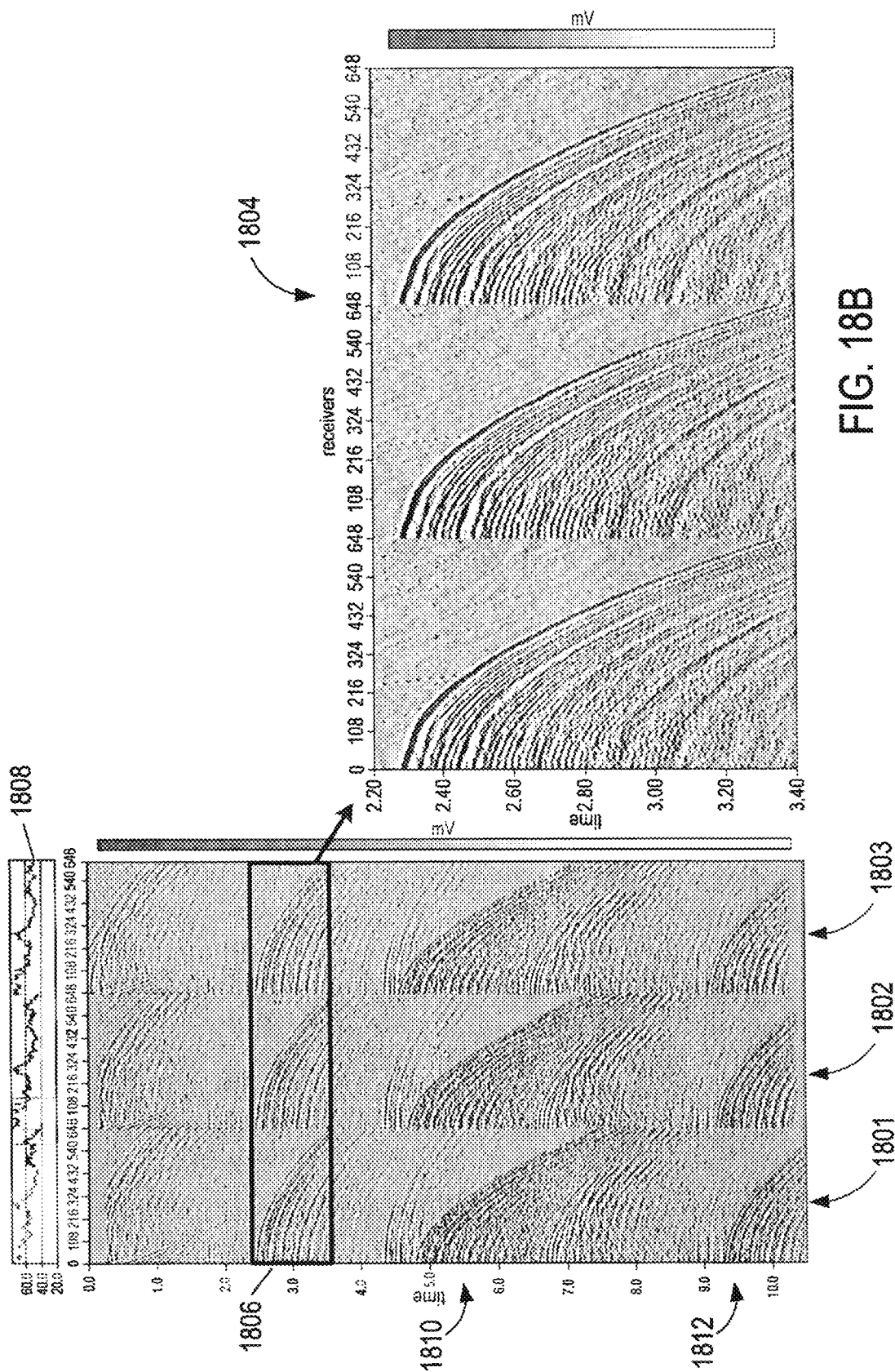
Figure 18C:
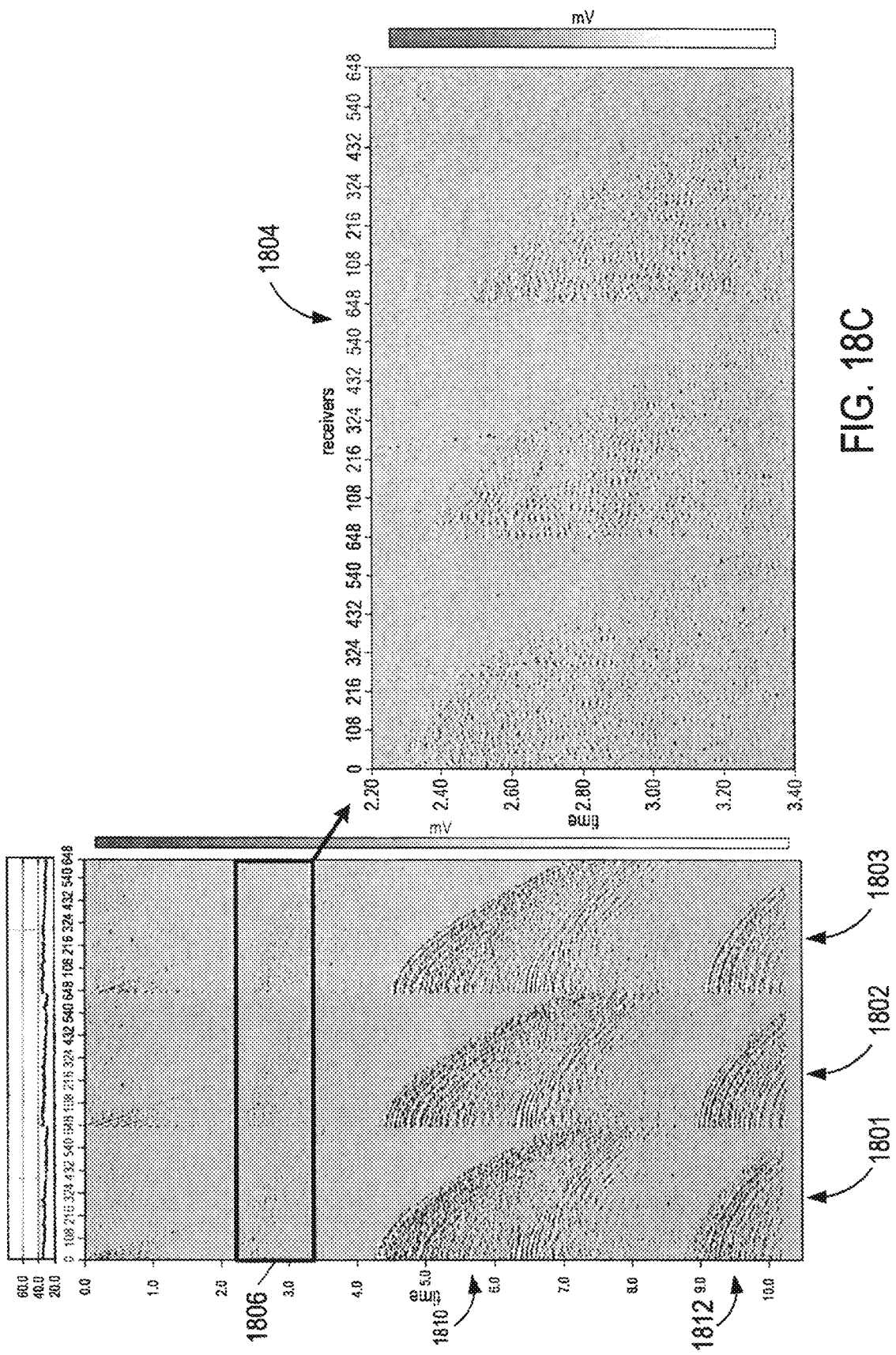

FIGS. 18A-18C show an example of removing RAE from three synthetic shot gathers in accordance with the methods described above. FIGS. 18A-18C shows three consecutive shot gathers 1801-1803 placed side by side. Receivers for each gather are indexed 0 through 648. In this example, the gathers are generated for three consecutive source activations while continuously recording seismic data. FIGS. 18A-18C includes a magnified view 1804 of a rectangle 1806 surrounding RAE in all three gathers and a plot 1808 of the magnitude of RAE in the rectangle 1806. In FIG. 18A, primaries 1810 and multiples 1812 are aligned in time for all three gathers while wavefronts of RAE in rectangle 1806 are not aligned in time for all three gathers. In FIG. 18B, the gathers 1801 and 1802 were time shifted according to Equation (1) with respect to selected gather 1803, as described above with reference to FIGS. 13A-13C. The wavefronts of the RAE in magnified view 1804 and rectangle 1806 were aligned in time and the primaries 1810 and multiples 1812 were not aligned in time. The aligned gathers in FIG. 18B were f-x deconvolved in the receiver domain described above with reference to FIG. 14 to generate a set of model gathers which was a model of the RAE. As described above with reference to FIG. 15, the noise gathers are time shifted in order to align RAE in the noise gathers with the gathers of FIG. 18A and subtracted to give noise attenuated gathers in FIG. 18C.

Figure 19:
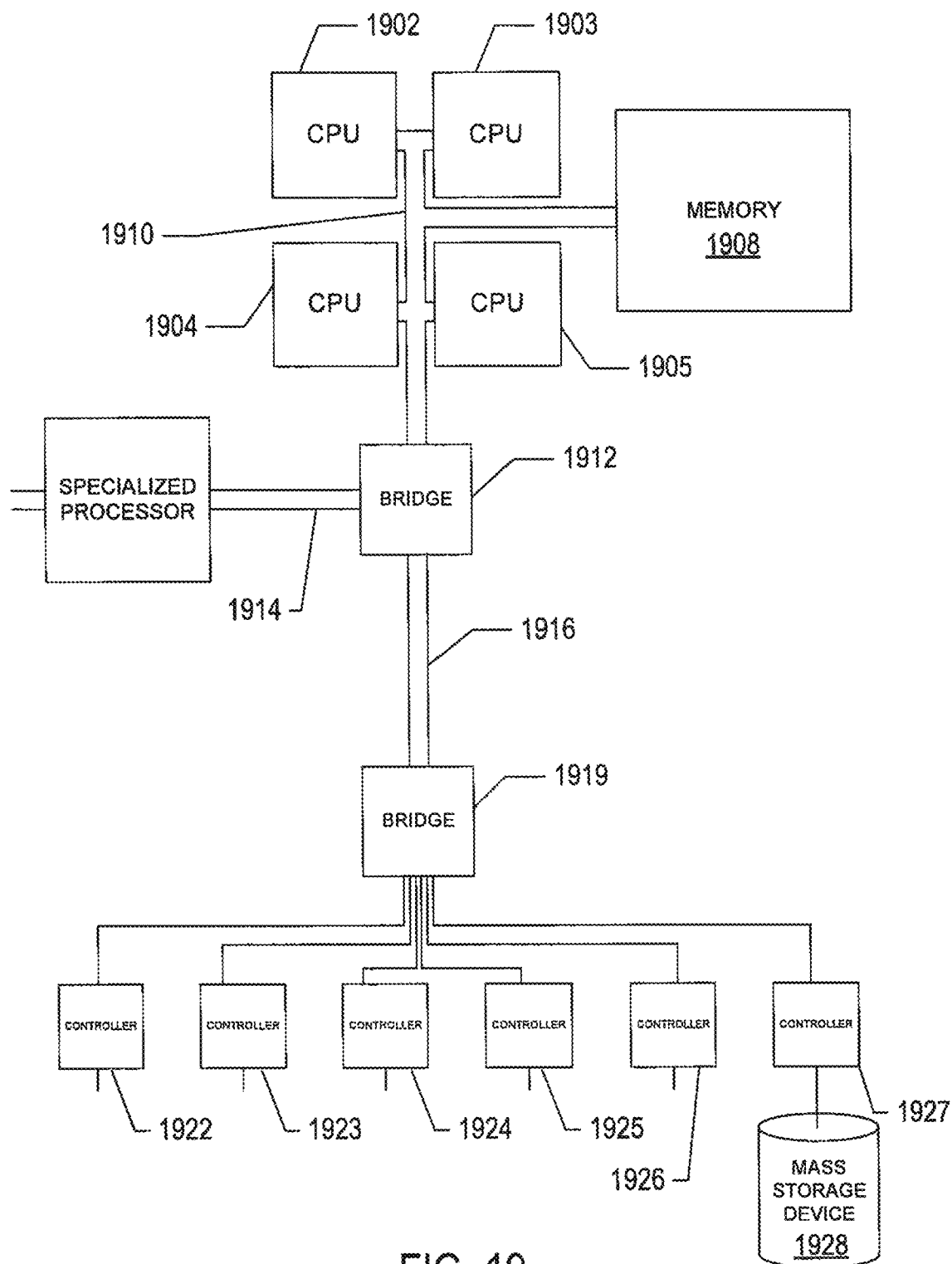
FIG. 19 shows an example of a generalized computer system that executes efficient methods for attenuating residual acoustic energy in seismic data.

FIG. 19 shows an example of a generalized computer system that executes efficient methods for attenuating RAE in a gather and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1902-1905, one or more electronic memories 1908 interconnected with the CPUs by a CPU/memory-subsystem bus 1910 or multiple busses, a first bridge 1912 that interconnects the CPU/memory-subsystem bus 1910 with additional busses 1914 and 1916, or other types of high-speed interconnection media, including multiple, high-speed serial interconnects. The busses or serial interconnections, in turn, connect the CPUs and memory with specialized processors, such as a graphics processor 1918, and with one or more additional bridges 1920, which are interconnected with high-speed serial links or with multiple controllers 1922-1927, such as controller 1927, that provide access to various different types of computer-readable media, such as computer-readable medium 1928, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1928 is a data-storage device, including electronic memory, optical or magnetic disk drive, USB drive, flash memory and other such data-storage device. The computer-readable medium 1928 can be used to store machine-readable instructions that encode the methods described above and can be used to store encoded data, during store operations, and from which encoded data can be retrieved, during read operations, by computer systems, data-storage devices, and peripheral devices.

The method described above may be implemented in real time on board a survey vessel while a survey is being conducted. For example, a noise gather may be generated for a sequence of activation sites of a sail line. The seismic data with attenuated RAE as described above form a geophysical data product indicative of certain properties of a subterranean formation. The geophysical data product may include processed seismic geophysical data and may be stored on a computer-readable medium as described above. The geophysical data product may be produced offshore (i.e. by equipment on survey vessel 102) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

Although the above disclosure has been described in terms of particular embodiments, it is not intended that the disclosure be limited to these embodiments. Modifications within the spirit of the disclosure will be apparent to those skilled in the art. For example, any of a variety of different implementations of noise attenuation can be obtained by varying any of many different design and development parameters, including programming language, underlying operating system, modular organization, control structures, data structures, and other such design and development parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process that generates an image of a subterranean formation using marine seismic techniques in which consecutively recorded seismic data gathers were generated in a marine seismic survey of the subterranean formation, each recorded gather is a record of acoustic reflections from the subterranean formation after each activation of a source and contains residual acoustic energy ("RAE") from one or more previous activations of the source, the specific improvement comprising:

aligning the recorded gathers in time to generate time-aligned gathers with the RAE coherent and the reflections incoherent between the time-aligned gathers;

generating model acoustic energy ("MAE") gathers of the RAE from the time-aligned gathers;

aligning one or more of the MAE gathers in time with the corresponding recorded gathers to generate one or more corresponding time-adjusted gathers;

subtracting one or more of the time-adjusted gathers from corresponding recorded gathers to generate one or more RAE attenuated gathers; and applying migration to one of the one or more RAE attenuated gathers to generate an image of the subterranean formation, thereby attenuating residual acoustic energy contamination in the seismic image.

2. The process of claim 1 wherein the recorded gathers recorded for consecutive activations of the source further comprise reflections that are coherent between the gathers and residual acoustic energy that is not coherent between the gathers.

3. The process of claim 1 wherein time intervals between source activations vary in duration.

4. The process of claim 1 wherein the recorded gathers are recorded in recording time intervals of varying duration.

5. The process of claim 1 wherein the consecutively recorded seismic data gathers further comprise continuously recorded seismic data partitioned by source activation times with time intervals between source activations that vary in duration.

6. The process of claim 1 wherein aligning the recorded gathers to generate the time-aligned gathers further comprises
selecting one of the gathers; and
time shifting the recorded gathers with respect to the selected gather so that the RAE in the gathers is aligned in time.

7. The process of claim 1 wherein generating the MAE gathers further comprises:
for each trace index of the time-aligned gather,
collecting traces with the same trace index from each of the RAE model gathers;
transforming the collection of traces from a space-time domain to a frequency-space domain to generate a spectrum for the collection of traces;
performing spatial f-x deconvolution to attenuate energy at each frequency associated with the reflections and retain energy at each frequency associated with the RAE; and
transforming the spectra from the frequency-space domain to the space-time domain to generate traces in the MAE gathers with the reflections attenuated and the RAE retained.

8. The process of claim 1 wherein aligning one or more of the RAE model gathers in time with the corresponding recorded gathers to generate one or more corresponding time-adjusted gathers further comprises:
for each of the one or more MAE gathers,
aligning the MAE gather with the corresponding recorded gather so that the RAE in the MAE gather is aligned in time with the RAE in the recorded gather to generate a time-adjusted gather.

9. The process of claim 1 wherein the reflections further comprise primary reflections and multiple reflections.

10. The process of claim 1 further comprising processing the gathers with attenuated RAE to generate a geophysical data product.

11. The process of claim 10 further comprising storing the geophysical data product on a tangible, non-volatile computer-readable medium suitable for importing onshore.

12. The process of claim 11 further comprising performing geophysical analysis onshore on the geophysical data product.

13. A computer system that generates an image of a subterranean formation from recorded seismic data acquired using marine seismic techniques, the system comprising:
one or more processors;
one or more data-storage devices; and
a routine stored in one or more of the data-storage devices that when executed by the one or more processors controls the system to carry out
receiving a number of consecutively recorded gathers of seismic data, each recorded gather is a record of acoustic reflections from a subterranean formation after each activation of a source towed by a survey vessel and contains residual acoustic energy ("RAE") from one or more previous activations of the source;
aligning the recorded gathers in time to generate time-aligned gathers with the RAE coherent and the reflections incoherent between the time-aligned gathers;
generating model acoustic energy ("MAE") gathers of the RAE from the time-aligned gathers;
aligning one or more of the MAE gathers in time with one or more of the corresponding recorded gathers to generate one or more corresponding time-adjusted gathers;
subtracting one or more of the time-adjusted gathers from corresponding recorded gathers to generate one or more RAE attenuated gathers; and
applying migration to one of the one or more RAE attenuated gathers to generate an image of the subterranean formation with attenuated RAE.

14. The system of claim 13 wherein the recorded gathers for consecutive activations of the source further comprise reflections that are coherent between the gathers and residual acoustic energy that is not coherent between the gathers.

15. The system of claim 13 wherein time intervals between source activations vary in duration.

16. The system of claim 13 wherein the recorded gathers are recorded in recording time intervals of varying duration.

17. The system of claim 13 wherein the consecutively recorded seismic data gathers further comprise continuously recorded seismic data partitioned by source activation times with time intervals between source activations that vary in duration.

18. The system of claim 13 wherein aligning the recorded gathers to generate the time aligned gathers further comprises
selecting one of the gathers; and
time shifting the recorded gathers with respect to the selected gather so that the RAE in the gathers are aligned in time.

19. The system of claim 13 wherein generating the MAE gathers further comprises:
for each trace index of the time-aligned gather,
collecting traces with the same trace index from each of the RAE model gathers;
transforming the collection of traces from a space-time domain to a frequency-space domain to generate a spectrum for the collection of traces;
performing spatial f-x deconvolution to attenuate energy at each frequency associated with the reflections and retain energy at each frequency associated with the RAE; and
transforming the spectra from the frequency-space domain to the space-time domain to generate traces in MAE gathers with the reflections attenuated and the RAE retained.

20. The system of claim 13 wherein aligning one or more of the RAE model gathers in time with one or more of the corresponding recorded gathers to generate one or more corresponding time-adjusted gathers further comprises:
for each of the one or more MAE gathers,
aligning the MAE gather with the corresponding recorded gather so that the RAE in the MAE gather is aligned in time with the RAE in the recorded gather to generate a time-adjusted gather.

21. The system of claim 13 wherein the reflections further comprise primary reflections and multiple reflections.

22. The system of claim 13 further comprising processing the gathers with attenuated RAE to generate a geophysical data product.

23. The system of claim 22 further comprising storing the geophysical data product on a tangible, non-volatile computer-readable medium suitable for importing onshore.

24. The system of claim 23 further comprising performing geophysical analysis onshore on the geophysical data product.

25. A non-transitory computer-readable medium having machine-readable instructions encoded thereon for enabling one or more processors of a computer system to perform operations comprising:

receiving a number of consecutively recorded gathers, each recorded gather is a record of acoustic reflections from a subterranean formation after each activation of a source towed by a survey vessel and contains residual acoustic energy ("RAE") from one or more previous activations of the source;

aligning the recorded gathers in time to generate time-aligned gathers with the RAE coherent and the reflections incoherent between the time-aligned gathers;

generating model acoustic energy ("MAE") gathers of the RAE from the time-aligned gathers;

aligning one or more of the MAE gathers in time with one or more of the corresponding recorded gathers to generate one or more corresponding time-adjusted gathers;

subtracting one or more of the time-adjusted gathers from corresponding recorded gathers to generate one or more RAE attenuated gathers; and applying migration to one of the one or more RAE attenuated gathers to generate an image of the subterranean formation with attenuated RAE.

26. The medium of claim 25 wherein the recorded gathers recorded for consecutive activations of the source further comprise reflections that are coherent between the gathers and residual acoustic energy that is not coherent between the gathers.

27. The medium of claim 25 wherein time intervals between source activations vary in duration.

28. The medium of claim 25 wherein the recorded gathers are recorded in recording time intervals of varying duration.

29. The medium of claim 25 wherein the consecutively recorded seismic data gathers further comprise continuously recorded seismic data partitioned by source activation times with time intervals between source activations that vary in duration.

30. The medium of claim 25 wherein aligning the recorded gathers to generate the time-aligned gathers further comprises selecting one of the gathers; and time shifting the recorded gathers with respect to the selected gather so that the RAE in the gathers are aligned in time.

31. The medium of claim 25 wherein generating the MAE gathers further comprises:

for each trace index of the time-aligned gather, collecting traces with the same trace index from each of the RAE model gathers;

transforming the collection of traces from a space-time domain to a frequency-space domain to generate a spectrum for the collection of traces;

performing spatial f-x deconvolution to attenuate energy at each frequency associated with the reflections and retain energy at each frequency associated with the RAE; and transforming the spectra from the frequency-space domain to the space-time domain to generate traces in the MAE gathers with the reflections attenuated and the RAE retained.

32. The medium of claim 25 wherein aligning one or more of the RAE model gathers in time with one or more of the corresponding recorded gathers to generate one or more corresponding time-adjusted gathers further comprises:

for each of the one or more MAE gathers, aligning the MAE gather with the corresponding recorded gather so that the RAE in the MAE gather is aligned in time with the RAE in the recorded gather to generate a time-adjusted gather.

33. The medium of claim 25 wherein the reflections further comprise primary reflections and multiple reflections.

34. The medium of claim 25 further comprising processing the gathers with attenuated RAE to generate a geophysical data product.

35. The medium of claim 34 further comprising storing the geophysical data product on a tangible, non-volatile computer-readable medium suitable for importing onshore.

36. The medium of claim 35 further comprising performing geophysical analysis onshore on the geophysical data product.

* * * * *